(12) United States Patent
Duggal

(10) Patent No.: US 8,185,581 B2
(45) Date of Patent: May 22, 2012

(54) PROVIDING A LOCAL DEVICE WITH COMPUTING SERVICES FROM A REMOTE HOST

(75) Inventor: Sachin Dev Duggal, London (GB)

(73) Assignee: nHoldings SA, Le Mont-sur-Lausanne (CH)

( * ) Notice: Subject to any disclaimer, the term of this patent is extended or adjusted under 35 U.S.C. 154(b) by 205 days.

(21) Appl. No.: 12/782,660

(22) Filed: May 18, 2010

(65) Prior Publication Data

US 2010/0299187 A1 Nov. 25, 2010

Related U.S. Application Data

(60) Provisional application No. 61/179,636, filed on May 19, 2009.

(51) Int. Cl.
*G06F 15/16* (2006.01)

(52) U.S. Cl. ........ 709/203; 709/202; 709/220; 709/225; 709/226; 709/229; 717/168

(58) Field of Classification Search .................. 709/202, 709/203, 220, 225, 226, 229; 717/168
See application file for complete search history.

(56) References Cited

U.S. PATENT DOCUMENTS

| | | | |
|---|---|---|---|
| 5,771,354 A | 6/1998 | Crawford | |
| 6,216,112 B1 | 4/2001 | Fuller et al. | |
| 6,523,036 B1 | 2/2003 | Hickman | |
| 6,980,969 B1 | 12/2005 | Tuchler et al. | |
| 7,096,253 B2 * | 8/2006 | Vinson et al. | 709/203 |
| 7,249,054 B2 | 7/2007 | Keil | |
| 7,478,035 B1 | 1/2009 | Wrench et al. | |
| 7,512,799 B1 | 3/2009 | Chow et al. | |
| 8,112,505 B1 * | 2/2012 | Ben-Shaul et al. | 709/219 |
| 2001/0047406 A1 | 11/2001 | Araujo et al. | |
| 2002/0091697 A1 | 7/2002 | Huang et al. | |
| 2002/0102993 A1 | 8/2002 | Hendrey et al. | |

(Continued)

FOREIGN PATENT DOCUMENTS

JP 2001061020 A 3/2001

(Continued)

OTHER PUBLICATIONS

Baratto R. A. et al. Mobidesk: Mobile Virtual Desktop Computing Proceedings of the 1-th Annual Conference on Mobile Computing and Networking. Mobicom 2004., Philadelphia, PA, Sep. 26-Oct. 1, 2004, Annual Int'l Conference on Mobile Computing and Networking, NY, NY vol. conf.10, pp. 1-15.

(Continued)

*Primary Examiner* — Michael Won
(74) *Attorney, Agent, or Firm* — Perkins Coie LLP

(57) ABSTRACT

Systems and methods for providing a local device with computing services are disclosed. One embodiment includes, identifying one or more file types of files stored on the local device which is not associated with a local application that is installed on the local device and detecting a request to access a file stored on the local device having one of the one or more file types. The remote host can generate an offer to provide access to a remote application which is able to open the file for a fee such that the file is accessible via the local device. A selected service model can determine the fee and whether the remote application is provided for use by the local device when offline.

28 Claims, 16 Drawing Sheets

U.S. PATENT DOCUMENTS

| | | |
|---|---|---|
| 2002/0124137 A1 | 9/2002 | Ulrich et al. |
| 2002/0174010 A1 | 11/2002 | Rice |
| 2002/0196279 A1 | 12/2002 | Bloomfield et al. |
| 2003/0065676 A1 | 4/2003 | Gbadegesin et al. |
| 2004/0255289 A1 | 12/2004 | George et al. |
| 2006/0136389 A1* | 6/2006 | Cover et al. .................. 707/3 |
| 2006/0184652 A1 | 8/2006 | Teodosiu et al. |
| 2007/0083620 A1 | 4/2007 | Pedersen |
| 2007/0192329 A1 | 8/2007 | Croft et al. |

FOREIGN PATENT DOCUMENTS

| | | |
|---|---|---|
| KR | 1020060018031 | 2/2006 |
| WO | WO-2007060680 | 5/2007 |
| WO | WO-2007132471 A1 | 11/2007 |
| WO | WO-2008012829 | 1/2008 |
| WO | WO-2008059510 | 5/2008 |
| WO | WO-2008059511 | 5/2008 |
| WO | WO-2008059535 | 5/2008 |
| WO | WO-2009/001221 A2 | 12/2008 |

OTHER PUBLICATIONS

European Search Report EP 08 15 0914.3.
Final Office Action Mailed Feb. 19, 2010 in U.S. Appl. No. 11/845,948, filed Aug. 28, 2007.
Final Office Mailed Mar. 7, 2011 in U.S. Appl. No. 11/845,948, filed Aug. 27, 2007.
International Search Report PCT/IB2008/002534 dated May 15, 2009; pp. 1-3.
International Search Report PCT/US2010/035308 dated Dec. 6, 2010; pp. 1-3.
Non-Final Office Action Mailed Jun. 25, 2010 in U.S. Appl. No. 11/845,948, filed Aug. 28, 2007.
Non-Final Office Action Mailed Sep. 30, 3009 in U.S. Appl. No. 11/845,948, filed Aug. 28, 2007.
Non-Final Office Action Mailed Sep. 6, 2011 in U.S. Appl. No. 11/845,948, filed Aug. 28, 2007.
U.S. Appl. No. 11/845,948, filed Aug. 28, 2007.
U.S. Appl. No. 60/913,348, filed Apr. 23, 2007.
U.S. Appl. No. 60/945,916, filed Jun. 23, 2007.
U.S. Appl. No. 61/179,636, filed May 19, 2009.
U.S. Appl. No. 61/295,038, filed Jan. 14, 2010.
Written Opinion PCT/IB2008/002534 dated May 15, 2009; pp. 1-8.
Written Opinion PCT/US2010/035308 dated Dec. 6, 2010; pp. 1-4.
Yuedong Zhang, et al—A Remote Desktop Architecture for the Distributed Virtual Personal Computing, Grid and Cooperative Computing, 2006, GCC 2006 Fifth International Conference, IEEE, PI, Oct. 1, 2006, pp. 1-8.

* cited by examiner

US 8,185,581 B2

PROVIDING A LOCAL DEVICE WITH COMPUTING SERVICES FROM A REMOTE HOST

CLAIM OF PRIORITY

This application claims priority to U.S. Provisional Patent Application No. 61/179,636 entitled "METHODS OF INTERACTION WITH A STREAMED VIRTUAL COMPUTER", which was filed on May 19, 2009, the contents of which are expressly incorporated by reference herein.

BACKGROUND

Personal computing systems often require maintenance and protection from damage. Such personal computing systems can be lost, stolen or otherwise rendered inaccessible leading to lost productivity. One probable solution to the problem posed by a personal computing system is a networked computing system or environment. Such a system can maintain a virtual machine accessible from a network. However, a virtual computing system offers another set of challenges.

In regard to application use, a networked computing system can offer many applications that a user device does not have. However, when using the user device the user may not be aware of the various applications. Such a user may not use the applications even where the user has files that she cannot open.

In regard to file storage, such a networked computing environment can store files, but a user accessing the networked computing system may require file transfer between the networked computing system and the user device. Such transfers can be cumbersome requiring the use of network file transfer programs and moderate technical knowledge regarding the directory layout of the networked computing system. The hurdles may impede the use of the network computing system. For example, users may have some files on one computing system, but need them on another computing system. In regard to file sharing, today users are required to follow cumbersome processes.

DETAILED DESCRIPTION

Figure 1:
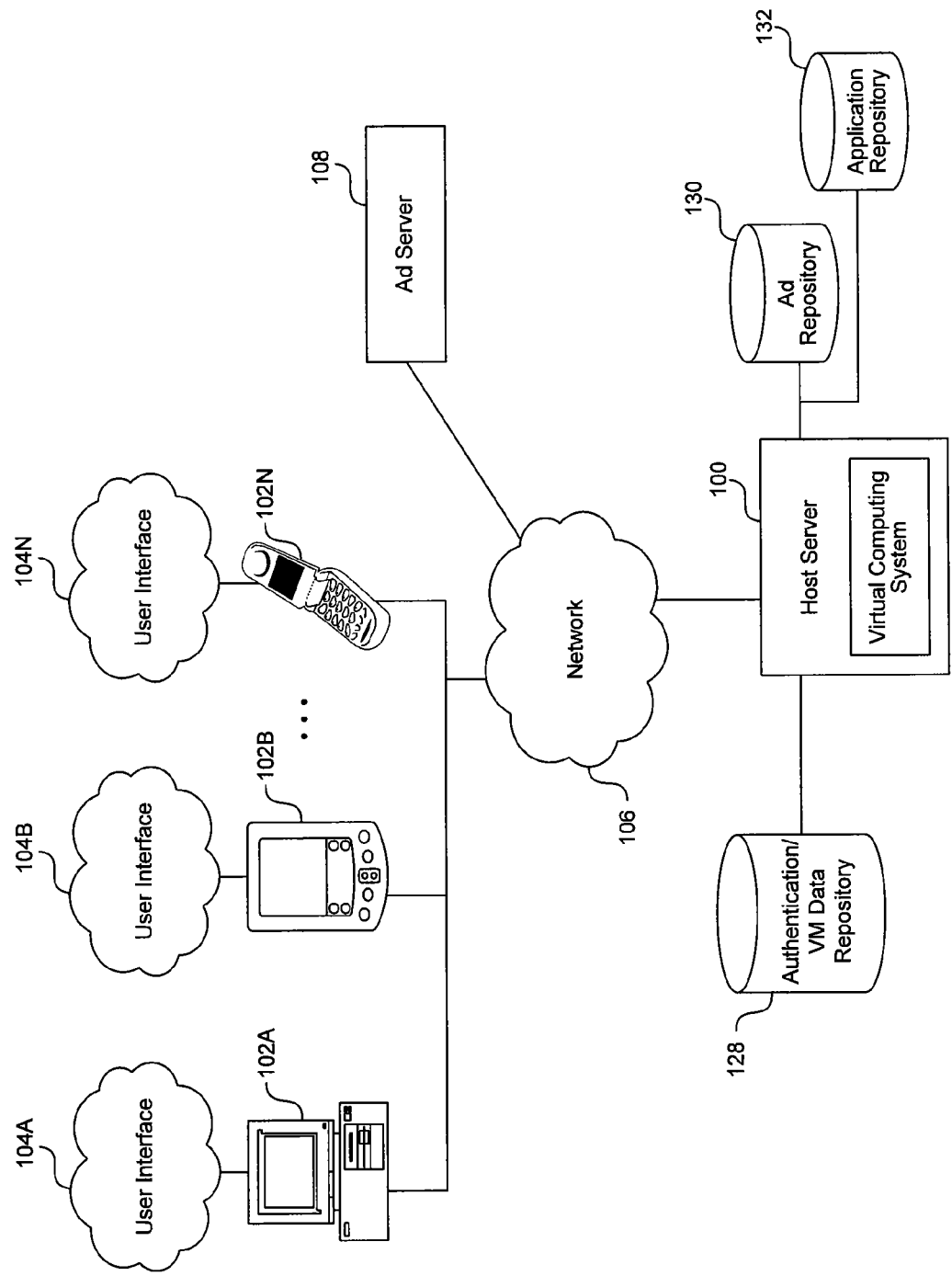
FIG. 1 illustrates a block diagram of client devices (local devices) and an ad server coupled to an example of a host server (remote server) that provides a virtual computing to the client devices through a network.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for providing a local device with computing services from a remote host.

FIG. 1 illustrates a block diagram of client devices 102A-N and an ad server 108 coupled to an example of a host server 100 (remote server) that provides virtual computing to the client devices 102A-N through a network 106.

The client devices 102A-N can be any system and/or device, and/or any combination of devices/systems that is able to establish a connection with another device, a server and/or other systems. The client devices 102A-N typically include display or other output functionalities to present data exchanged between the devices to a user. For example, the client devices and content providers can be, but are not limited to, a server desktop, a desktop computer, a thin-client device, an Internet kiosk, a computer cluster, a mobile computing device such as a notebook, a laptop computer, a handheld computer, a mobile phone, a smart phone, a PDA, a Blackberry device, a Treo, and/or an iPhone, etc. In one embodiment, the client devices 102A-N are coupled to a network 106. In some embodiments, the client devices may be directly connected to one another.

In one embodiment, the user devices 102 can interact with a virtual computing environment (e.g., a virtual computing environment provided by the virtual computing system hosted by the server 100). The virtual computing system in the server 100 can include one or more computing systems that host one or more virtual computing environments. Different user devices 102 may be assigned to different virtual environments. Access to the virtual environments may be user-specific and/or device specific. In some instances, users or devices use accounts to access a virtual computing environment which may be user-customized or device-customized.

The user devices 102 can interact with a virtual computing environment that is hosted remotely to access computing services including but not limited to, remote storage, backup, and/or synchronization services. In addition, user devices 102 can access software/applications available in the virtual computing environment. For example, a user device 102 may use software/applications installed remotely in the virtual computing environment on a remote host to access/open/read/edit content (e.g., streamed content) or files locally stored.

The locally stored content/files can be sent in part or in whole to the virtual computing environment for access by the remote application. Alternatively, the remote application can be streamed and/or cached in part and/or downloaded in whole by the user device 102 such that the content/file can be executed or otherwise accessed on the user device 102.

The network 106, over which the client devices 102A-N may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices, host server, and may appear as one or more networks to the serviced systems and devices. In one embodiment, communications to and from the client devices 102A-N can be achieved by, an open network, such as the Internet, or a private network, such as an intranet and/or the extranet. In one embodiment, communications can be achieved by a secure communications protocol, such as secure sockets layer (SSL), or transport layer security (TLS).

The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the World Wide Web and is coupled to the Internet. The physical connections of the Internet and the protocols and communication procedures of the Internet and the web are well known to those of skill in the relevant art. For illustrative purposes, it is assumed the network 106 broadly includes anything from a minimalist coupling of the components illustrated in the example of FIG. 1, to every component of the Internet and networks coupled to the Internet.

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The client devices 102A-N can be coupled to the network (e.g., Internet) via a dial up connection, a digital subscriber loop (DSL, ADSL), cable modem, and/or other types of connection. Thus, the client devices 102A-N can communicate with remote servers (e.g., web server, host server, mail server, and instant messaging server) that provide access to user interfaces of the World Wide Web via a web browser, for example.

The authentication/VM data repository 128, ad repository 130, and application repository 132 can store software, descriptive data, images, system information, drivers, and/or any other data item utilized by parts of the host server 100 for operation. The repositories may also store user information and user content, such as, user profile information, user preferences, content information, network information, etc. The repositories may be managed by a database management system (DBMS), for example but not limited to, Oracle, DB2, Microsoft Access, Microsoft SQL Server, PostgreSQL, MySQL, FileMaker, etc. The ad repository 130 may additionally store advertisements and the application repository 132 may store software programs/applications executable by the host server 100 in one or more virtual computing environments or remotely accessible by a user device 102.

The repositories can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package. In addition, the host server 100 is able to retrieve data from the authentication/VM data repository 128, ad repository 130, and/or application repository 132.

Figure 9:
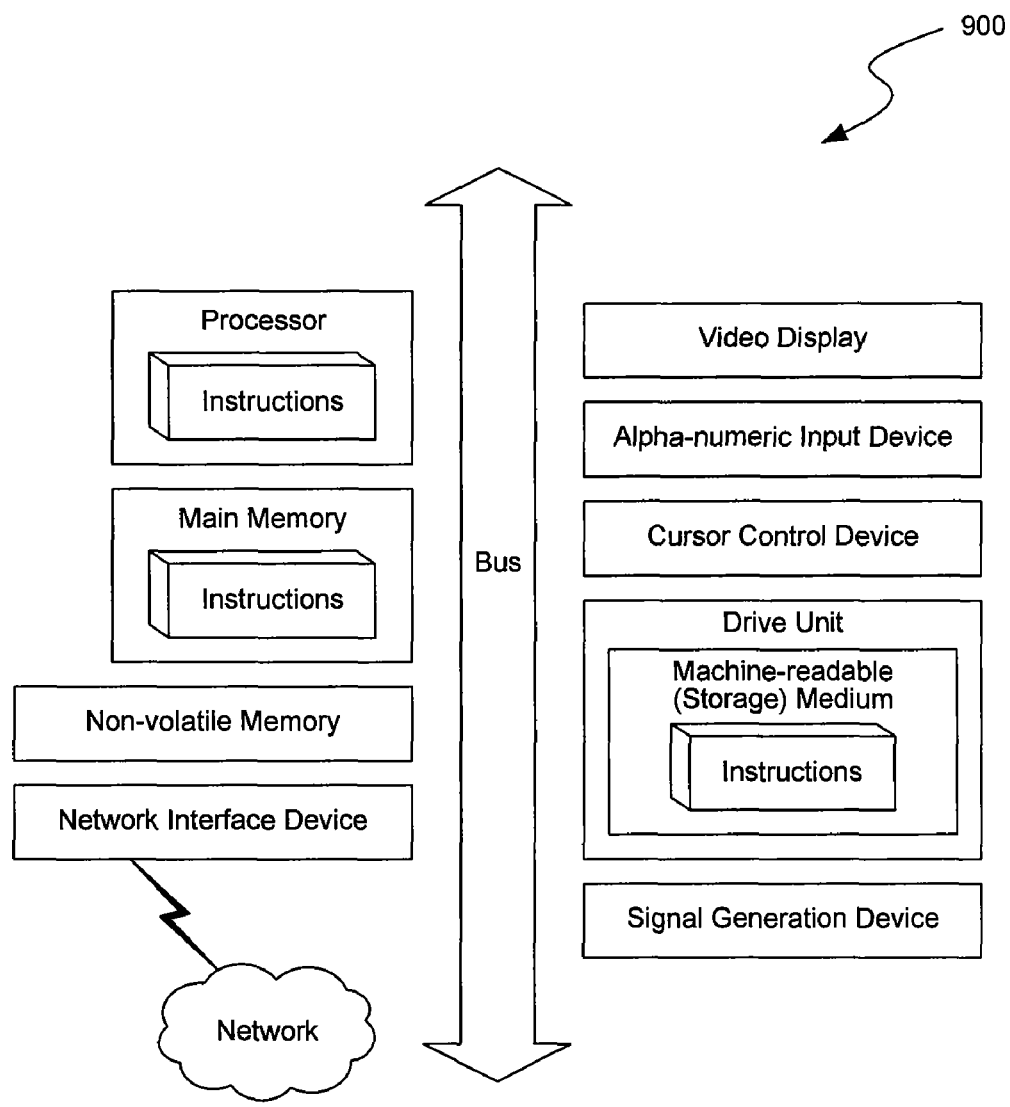
FIG. 9 shows a diagrammatic representation of a machine in the example form of a computer system within which a set of instructions, for causing the machine to perform any one or more of the methodologies discussed herein, may be executed.

The host server 100 can be implemented on a known or convenient computer system, such as is illustrated in FIG. 9. The host server 100 is described in more detail with reference to FIG. 2.

Figure 2:
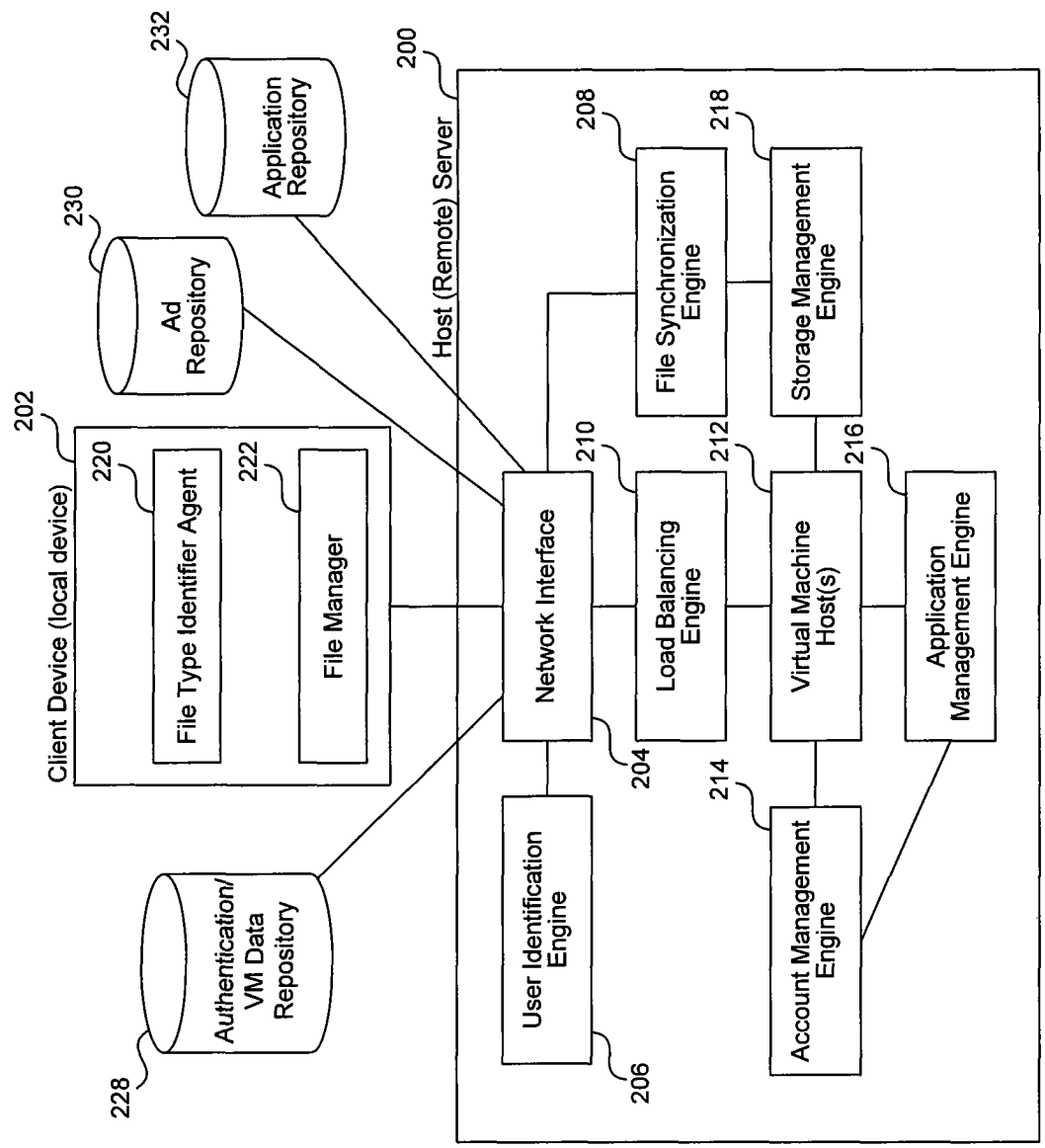
FIG. 2 depicts a block diagram illustrating an example of a host server (remote server) that provides a client device (local device) with computing services.

FIG. 2 depicts a block diagram illustrating an example of a host server 200 that provides a client device (local device) 202 with computing services.

The host server 200 can include an authentication/VM repository 228, an ad repository 230, and/or the application repository 232. The host server 200 may be communicatively coupled to the authentication/VM repository 228 the ad repository 230, and/or the application repository 232 as illustrated in FIG. 2. In some embodiments, the authentication/VM repository 228 the an ad repository 230, and/or the application repository 232 are partially or wholly internal to the host server 200.

In the example of FIG. 2, the host server 200 includes a network interface 204, a user ID engine 206, a file synchronization engine 208, a load balancing engine 210, a virtual machine host 212, an application management engine 216, and/or a storage management engine 218. Note that each component of the host server 200 can reside on a different block or grid.

As used in this paper, an "engine" includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The host server 200 may be coupled to a client device (local device) 202 such as the client device 102 in the example of FIG. 1. The client device 202 can include a file type identifier agent 220 and/or a file manager 222. The agent 220 and/or the manager 222 may be locally installed on the client device 202 or streamed, downloaded from the host server 200, for example, upon account registration or on demand.

In the example of FIG. 2, the network controller 204 can be one or more networking devices that enable the host server 200 to mediate data in a network with an entity that is external to the host server, through any known and/or convenient communications protocol supported by the host and the external entity. The network controller 202 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

A firewall, can, in some embodiments, be included to govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure. In some embodiments, the functionalities of the network interface 202 and the firewall are partially or wholly combined and the functions of which can be implemented in any combination of software and/or hardware, in part or in whole.

One embodiment of the host server 200 includes a user ID engine 206. The user ID engine 206 can be implemented, example, as software embodied in a computer-readable medium or computer-readable storage medium on a machine, in firmware, in hardware, in a combination thereof, or in any applicable known or convenient device or system. This and other engines described in this specification are intended to include any machine, manufacture, or composition of matter capable of carrying out at least some of the functionality described implicitly, explicitly, or inherently in this specification, and/or carrying out equivalent functionality.

The user ID engine 206 can be any combination of hardware components and/or software agents able to identify a user and/or client device to manage access to virtual machines, remote storage, applications, etc.

The user ID engine 206 can create an account for a user and/or a client device for accessing a virtual machine. The user can use the account credentials to login to access a virtual machine where his/her content/files are stored. For example, the user ID engine 206 may receives a request from a user or client device to access the network, validates authentication credentials, and allows the user device to transmit and receive data through the network interface 204; alternatively the user ID engine 206 receives the authentication credentials, finds the credentials invalid, and refuses admission to the network.

One embodiment of the host server 200 includes the authentication/VM data repository 228. In the example of FIG. 2, the authentication/VM data repository 228 can be implemented, for example, as software embodied in a computer-readable medium or computer-readable storage medium on a machine, in firmware, in hardware, in a combination thereof, or in any applicable known or convenient device or system.

This and other repositories such as databases described in this specification are intended to include any organization of data, including tables, comma-separated values (CSV) files, traditional databases (e.g., MYSQL), or other applicable known or convenient organizational formats. Some repositories/databases may require database interfaces, which are assumed to be incorporated in the database or the component coupled to the database in this and other figures, if applicable.

In one embodiment, the repository 228 can be used to store access credentials, authorization information, and/or account information of users and/or client devices. As used herein, "authorization information" is interpreted to mean a username and password, keys defined under a scheme such as public-key cryptography, or another known or convenient form of access control. The access credentials can be used by the user ID engine 206 to determine whether a user can access a specific virtual machine. The credentials can also be used by the user ID engine 206 to identify the content, files, and/or storage directories to which the user has access to and the type of access (e.g., read, write, delete, etc.). In one embodiment, the access credentials can be used by the engine 206 to determine the software programs and/or applications to which the user or client device has access to (e.g., subscription, purchase, rental, etc.).

In addition, privacy attributes of content stored in the remote storage on the host server 200 can also be stored in the repository 208. The storage can be included in a single mass storage device, plurality of mass storage devices, storage managed by a storage controller, or any known or convenient storage device. The storage need not be local to a computing system performing the storage, and can be accessible over a network. For example, storage could be a disk could be coupled to the virtual computing system, a partition on a volume derived from a RAID (redundant array of independent disks), or any other known or convenient storage system. The storage can be public, private, or otherwise designated.

As used herein, "public" access is defined as storage any user can access. Read and write permission can be specified, or not, as is desirable. For example, a user can set up public storage to allow read only access, read and write access, or another known or convenient set of permissions. As used herein, "private" access is defined to include access to only those individuals specified as having permission to access the "private" storage. An individual user can designate "buddies," or other users of the virtual computing system as having access to the private storage of the user. For example, a user, "Jane," can list "Joe," "David," and "Lisa" as having private access, a system can automatically create a list of buddies associated with the user, or any known or convenient manner of assigning private access can be used. In one embodiment, vanity URLs can be used for logging into a user's account to access the storage.

The authentication/VM data repository 228 can further store virtual machine data, data files, the virtual machines themselves, and data/system files for instantiating virtual machines. For example, the authentication/VM data repository 228 can store a file including data and instructions executed by a virtual machine host to produce a virtual machine. Additional, the authentication/VM data repository 228 can store user data generated by a user of the virtual machine.

One embodiment of the host server 200 includes a load balancing engine 210. The load balancing engine 210 can be implemented, example, as software embodied in a computer-readable medium or computer-readable storage medium on a machine, in firmware, in hardware, in a combination thereof, or in any applicable known or convenient device or system.

The load balancing engine 210 can be any combination of hardware components and/or software agents able to balance the resource demands among various virtual machine hosts 212 in the host server 200.

For example, assume there are 2 virtual machine hosts; 10 users might transmit 10 requests for 10 virtual machines. The load balancing engine 210 can re-distribute the requests among the 2 virtual machine hosts so that each of the virtual machine hosts receives five of the 10 requests. Alternatively, the load balancing engine 210 can redistribute the requests unequally, such as where the virtual machine hosts have unequal resources. Suppose there are two virtual machine hosts and one of the hosts has twice the resources as the other. The load balancing engine can re-distribute the load so that ⅔ of the requests are distributed to one machine and ⅓ of the requests are distributed to the other machine. Further, in another alternative, the load balancing engine 210 could redistribute the load according to any known or convenient load balancing scheme.

In one embodiment, the load balancing engine 210 can determine the number and types of requests to access a virtual machine. In addition, the engine 210 may further identify the needed resource intensity of the requests. Based on the number of requests and the predicted resource intensity, the engine 210 can assign the request to the virtual machine hosts 212 to ensure that the load is relatively balanced among the hosts 212 to enhance or improve performance and/or user experience.

In the example of FIG. 2, the virtual machine hosts 212 can include individualized hardware units executing instructions supporting one or more virtual computing environments (e.g. virtual machines). Each of the virtual machine hosts 212 can have a processor and memory, as well as a network interface for transmitting and receiving data for the virtual machines.

The virtual machine hosts 212 can include any number of hardware units or computers. For example, the virtual machine hosts 212 can include, rack-mount computing servers, desktop machines, shared resource computing systems, clustered computers, distinct computing systems operating on a single hardware unit or any known or convenient computing systems, or any combination of thereof.

For example, one embodiment of the host server 200 includes a account management engine 214. The account management engine 214 can be implemented, example, as software embodied in a computer-readable medium or computer-readable storage medium on a machine, in firmware, in hardware, in a combination thereof, or in any applicable known or convenient device or system.

The account management engine 214 can be any combination of hardware components and/or software agents able to manage billing, transactions, and advertising related matters.

For example, when an application or software program stored in the virtual machine hosts 212 is requested by a user or client device 202, the engine 214 can determine whether a fee is to be assessed. The fee that is assessed can depend on a service model that the requesting user or client device 202 is subscribed to. Multiple types of service models can be provided to users for accessing the virtual machine hosts 212 and the services that are thus provided.

Any number of service models can be provided. For example, a user can sign up for a one time subscription service where a fixed fee is due upon signing or prior to initial use. The fixed fee can allow the user to access any amount of storage and/or use any number of software programs/applications on the virtual machine hosts 212.

Alternatively, a user can sign up for a pay per use type model. For example, a user can pay a fee for each hour the client device 202 is connected to the virtual machines 212. Various tiers of fee structures can be provided to allow users more or less storage space. In addition, various tiers of fee structures can be provided to govern application access. For example, a higher fee may be assessed for access to more applications and/or for a longer period of time.

In general, the user/client device 202 can select a service model to access software on a per use basis, to rent it for a period of time, to purchase it such that it is always available. In addition, a user can typically select a service model/fee structure such that a software program is only available for access when the client device 202 is online (e.g., connected to a network) or also when the client device 202 is offline (e.g., disconnected from a network) as well.

Based on the applicable service model/fee structure, the account management engine 214 can handle payments. In one embodiment, the engine 214 determines the amount due from a user and when the due date/time is, for example, based on the user or user device's request to access the virtual machine hosts 212. The engine 214 can receive, process, and validate payment information and credit the payment to the user's account.

When a request to access a software program is received, the engine 214 can identify the relevant service model/fee structure, which may be selected by a user or applicable by default. For example, the engine 214 can determine the amount of fee to assess based on whether the user wishes to rent or purchase the application. Additionally, the engine 214 can assess the fee based on the length of the rental. In some instances, free trials are granted to select or first time users.

In certain examples of service models, access of advertisements can be an option in waiving some or all of the fees otherwise due for access of the virtual machine hosts 212. For example, access of a predetermined number of ads by a user or via a client device 202 may allow the user to access the virtual machines 212 or the applications/software programs stored thereon free of charge for a certain amount of time.

As used herein "rental" of software refers to a transaction between a user and a virtual computing system in which a software application is executed on a virtual machine host for an agreed upon duration of a time. For example, a user can "rent" a file conversion program for a single use, such as to open a file in an uncommon format. Alternatively, a user can rent a graphics editing program for a month at a specified fee; the graphics program could be executed on a virtual machine host on behalf of the user who remotely uses the program as needed. Further, any known or convenient application could be rented. Upon termination of the rental agreement, the rented program can cease to respond to user requests to use the program. However, the termination of an agreement to rent a particular software application need not terminate a user's ability to execute other programs on the virtual host machine.

As used herein, "advertising" or an "ad" refers to any promotional content provided in the interest of persuading the purchase of products or services, the donation of money, the patronage of an event, promotion of an idea/concept, the performance of an act or another known or convenient purpose. "Advertising" can, but need not be for profit.

One embodiment of the host server 200 further includes an application management engine 216. The application management engine 216 can be implemented, for example, as software embodied in a computer-readable medium or computer-readable storage medium on a machine, in firmware, in hardware, in a combination thereof, or in any applicable known or convenient device or system.

The application management engine 216 can be any combination of hardware components and/or software agents able to control, select, determine, launch, deploy, and/or terminate the applications/software programs that execute on the virtual machine hosts 212.

In one embodiment, the engine 216 retrieves software programs/applications from the storage in the host server 200 and provides the retrieved software to one or more virtual machine hosts. Software/application retrieval (e.g., streamed, downloaded, or cached) can be performed in response to a request received from the client device 202, for example. The client device 202 can generate the request when a locally-stored file requires access by an application that is not locally installed on the client device 202.

In one embodiment, the account management engine 214 controls whether the application management engine 216 is allowed to provide a certain software program/application to the virtual machine hosts 212 for execution based on whether the requisite fees have been paid by the requestor.

In some instances, the client device 202 has a file type identifier agent 220. The file type identifier agent 220 can be implemented, for example, as software embodied in a computer-readable medium or computer-readable storage medium on a machine, in firmware, in hardware, in a combination thereof, or in any applicable known or convenient device or system.

In general, the file type identifier agent 220 can be any combination of hardware components and/or software agents able to identify or detect file types of data or files on a device. In one embodiment, the agent 220 can identify one or more file types of files stored on the client device 202 which are not associated with a local application that is installed on the client device 202. For example, file extension mapping can be performed to determine whether the data is accessible by the applications that are installed on the client device 202.

In some instances, the client device 202 has a file manager 222. The file manager 222 can be implemented, for example, as software embodied in a computer-readable medium or computer-readable storage medium on a machine, in firmware, in hardware, in a combination thereof, or in any applicable known or convenient device or system.

In general, the file manager 222 can be any combination of hardware components and/or software agents able to detect a request to access content, files, directories on a device. In one embodiment, the file manager 222 is coupled to the agent 220 and can detect a request to access a file stored on the local device having one of the one or more file types not accessible by a locally installed application/software program. Upon detecting such a request, the file manager 222 can establish a communication with the host server 200 to request to access a remote application to access the local file. The remote application can be streamed.

One embodiment of the host server 200 further includes a file synchronization engine 208. The file synchronization engine 208 can be implemented, for example, as software embodied in a computer-readable medium or computer-readable storage medium on a machine, in firmware, in hardware, in a combination thereof, or in any applicable known or convenient device or system.

In general, the file synchronization engine 208 can be any combination of hardware components and/or software agents able to synchronize, store, update, modify, and/or delete content, files, and/or directories between two storage devices.

For example, the engine 208 can synchronize (e.g., copy, transmit, send, upload, store, etc.) content stored on the client device 202 on the remote storage of the host server 200. The content may be associated with a local directory on the client device and synchronized with a remote directory on the remote storage device. The content can be streamed, downloaded, or cached. The content stored on the remote storage is typically associated with a user or client device and can have associated privacy settings. For example, the user can allow certain other users to have access rights to content in the remote directory.

Different directories or different files can have different privacy settings. For example, certain directories/files may be viewed/read by other users whereas other directories/files may be modified/deleted by other users. In some instances the remote directory can be accessed by the user using a URL. For example, a user can specify name.live.nivio.com, name.domain.topleveldomain (e.g., vanity URLs), or another known or convenient format. The URL can be created as a domain, sub-domain, or other known or convenient resource access device. Transfers can be effected using a URL. For example, a user specifies a copy operation from the user's machine to jane.live.nivio.com, and the files are transmitted over a network to storage associated with a user "Jane." Alternatively, a program automatically executes a read operation from public storage at location "publicmaterials.Lisa.domain-.topleveldomain." Additionally, a transfer involving a URL can be affected in any known or convenient manner.

In general, if a user uses multiple devices (e.g., a laptop, a smart phone, a desktop), content on each of the multiple devices can be synchronized on the remote storage on the host server 200 such that the user can access content stored on different devices through a single device when connected to the host server 200.

In one embodiment, a user can initiate content synchronization by performing a drag-and-drop action of the target content/file between the source and target directories. The source directory may be a local directory on the client device 202 and the target directory can be the remote directory on the host server 200. Alternatively, the drag and drop action can be performed from a local file to a virtual drive representing the remote storage associated with the remote host or from a virtual folder representing the remote storage associated with the remote host. In one embodiment, the content is converted to HTML upon transmission from the local device to the remote storage associated with the remote host.

To synchronize content between different locations, the file synchronization engine 208 can identify differences between data stored on the client device 202 and the virtual machine 212 on the host server (remote server) 200. The file synchronization engine 208 can copy data to and from the client device 202 to bring into line any differences between the data. For example, a user device could have a folder specified as a synchronization folder which is regularly compared with a folder in virtual machine storage on the host 200 and updated to reflect differences. Alternatively, the entire storage space on the client device 202 could be synchronized with a storage location in storage associated with the virtual machine.

Files can be present in one directory but not the other; and data may have been added or deleted. The files can be transferred to the virtual machine, and where separate storage is used, the files can be transferred to storage directly. For example, a user can prepare a file, document or other data storage device on a personal digital assistant (PDA) and save the file to storage local to the PDA. The storage local to the PDA can be synchronized with storage associated with a virtual machine. Alternatively, the file can be saved to storage on a storage server associated with a personal computing device, and synchronized with storage coupled to the virtual machine. Further any known or convenient storage devices can be synchronized.

Differences in files can be specified in changes to blocks of data making up the files, by changes to the contents of the files, or another known or convenient manner of identifying differences. For example, where a file has been edited the differences can include both deletions and additions. These changes can be captured and transmitted for addition and deletion from files in a directory to be synchronized. Synchronization can be completed by any known and convenient protocol. For example, the files could be transferred by FTP (file transfer protocol), iSCSI (internet small computer systems interface), or any other known or convenient manner of transferring files. Directories can be synchronized at any convenient time. A manually selected time can be used, or an automatically designated time can be used. For example, synchronization can be executed every 20 minutes, a user can instruct a user device to initiate synchronization, or another manner of synchronization can be selected.

Synchronization rules can be applied to determine whether to copy data to or from the client device 202, and whether to delete data from the client device and/or the virtual machine host 212 on the host server 200. For example, a rule for storage associated with a virtual machine 212 can be implemented to cause the storage associated with the virtual machine to reflect changes in storage associated with a user device, but not to allow changes to storage associated with the virtual machine to be reflected in storage associated with the user device. Alternatively, changes in virtual machine 212 storage could be reflected in the client device 202 storage. Further, any changes can be reflected in either or both of the client device storage and the virtual machine storage.

One embodiment of the host server 200 further includes a storage management engine 218. The storage management engine 218 can be implemented, for example, as software embodied in a computer-readable medium or computer-readable storage medium on a machine, in firmware, in hardware, in a combination thereof, or in any applicable known or convenient device or system.

In general, the storage management engine 218 can be any combination of hardware components and/or software agents able to control the access (e.g., read write, delete, update, modification, etc.) of content, files and/or directories stored on storage in the host server 200.

The storage management engine 218 can perform read and/or write operations on behalf of a virtual machine hosts 212 and/or the file synchronization engine 208. The storage management engine 218 can also manage physical disks. For example, the storage management engine 218 can be coupled to a storage controller (not shown) for access to a logical partition of a group of disks. Alternatively, the storage management engine 218 can directly access physical storage and perform read and write operations.

One embodiment of the host server 200 includes the ad (advertisement) repository 230. In the example of FIG. 2, the ad (advertisement) repository 230 can be implemented, for example, as software embodied in a computer-readable medium or computer-readable storage medium on a machine, in firmware, in hardware, in a combination thereof, or in any applicable known or convenient device or system.

The ads (advertisements) repository 230 can store ads and or advertisement account information as well as any information related to the advertisements. For example, the advertisements repository 230 can store images such as banner ads for delivery to a user during use of a virtual machine. Additionally, cost and pricing information charged to an advertiser can be stored.

One embodiment of the host server 200 includes the application repository 232. In the example of FIG. 2, the application repository 232 can be implemented, for example, as software embodied in a computer-readable medium or computer-readable storage medium on a machine, in firmware, in hardware, in a combination thereof, or in any applicable known or convenient device or system.

The apps repository 232 can be a repository of application executable files, libraries, supporting documentation, and other 232 or convenient application data. For example, the apps repository 232 can store a game and supplemental levels. Additionally, the apps repository 232 could store software manuals explaining the user of, e.g. video editing software.

Figure 3:
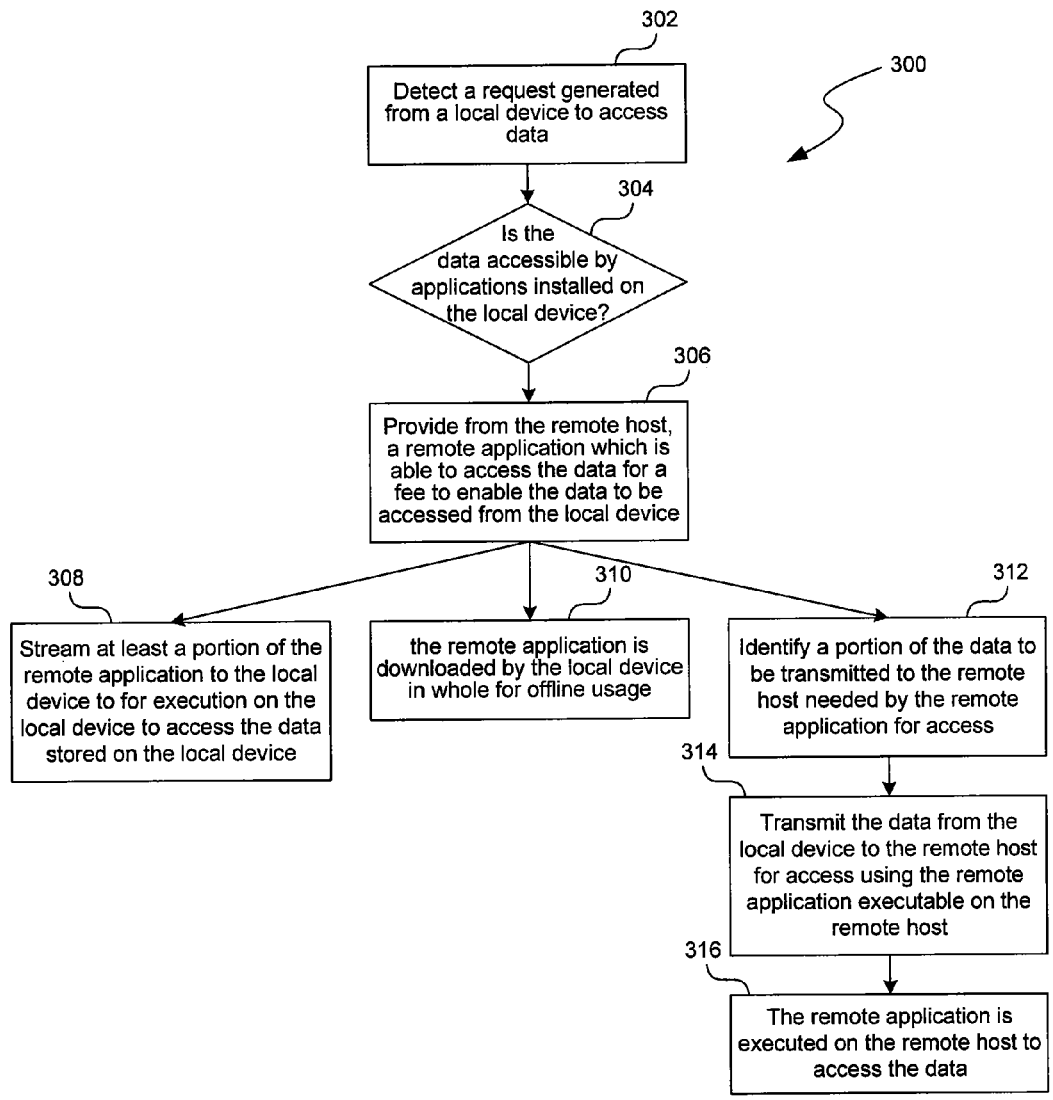
FIG. 3 depicts a flowchart of an example process of a remote host providing a local device with a remote application to access data that is otherwise not accessible by applications installed on the local device.

FIG. 3 depicts a flowchart of an example process of a remote host providing a local device with a remote application to access data that is otherwise not accessible by applications installed on the local device.

The method is organized as a sequence of processes in the flowchart 300. However, it should be understood that these and processes associated with other methods described herein may be reordered for parallel execution or into different sequences of processes.

In process 302, a request generated from a local device (e.g., the client device 202 in the example of FIG. 2) to access data is detected. The request can be generated in response to a user or application's attempt to open, view, edit, modify, or otherwise access content, data, or file on the local device.

In process 304, it is determined whether the data is accessible by applications installed on the local device. In one embodiment, an agent executing on the local device can perform file extension mapping on locally stored files/data and identify each one without locally compatible application/software program. The agent can be running continuously, periodically, or launched when a file access request is detected.

If not, in process 306, a remote application which is able to access the data o enable the data to be accessed from the local device is provided from the remote host (e.g., host server 200 in the example of FIG. 2). Depending on the applicable service model/fee structure, the remote application can be provided with or without requiring a fee. For example, fee can enable access to the remote application for a predetermined amount of time. Alternatively, the fee for access of the remote application can be waived if a predetermined number of advertisements displayed on the local device have been accessed.

In general, many options exist for using the remote application to access data on the local device. Such options may be determined at least in part by the applicable service model/fee structure, which may be selected by the user or set by default either by the local device or remote host. For example, the remote application can execute on the local device or on the remote host to access the data/file.

In process 308, at least a portion of the remote application is streamed to the local device to for execution on the local device to access the data stored on the local device. For example, the local data remains on the local device and the remote host streams the portions of the application needed to open/execute the local data to the local device such that the data/file can be locally executed. In process 310, the remote application is downloaded by the local device in whole. When the remote application is downloaded to the local device in whole, the application can be available for offline usage, for example, for a predetermined period of rental time. The rental time may be days, weeks, or months depending on, for example, the rental fee. The rental is typically renewable.

Alternatively, the data/file can be opened/executed on the remote host and the data/file can be stored on the remote storage of the remote host. For example, in process 312, a portion of the data to be transmitted to the remote host needed by the remote application for access is identified. In process 314, the data from the local device is transmitted to the remote host for access using the remote application executable on the remote host. In process 316, the remote application is executed on the remote host to access the data. In one embodiment, images of the remote application are transmitted to the local device for display on the local device depicting results of accessing the data. In addition, data modified by the remote application on the remote host is transmitted to the local device.

Figure 4:
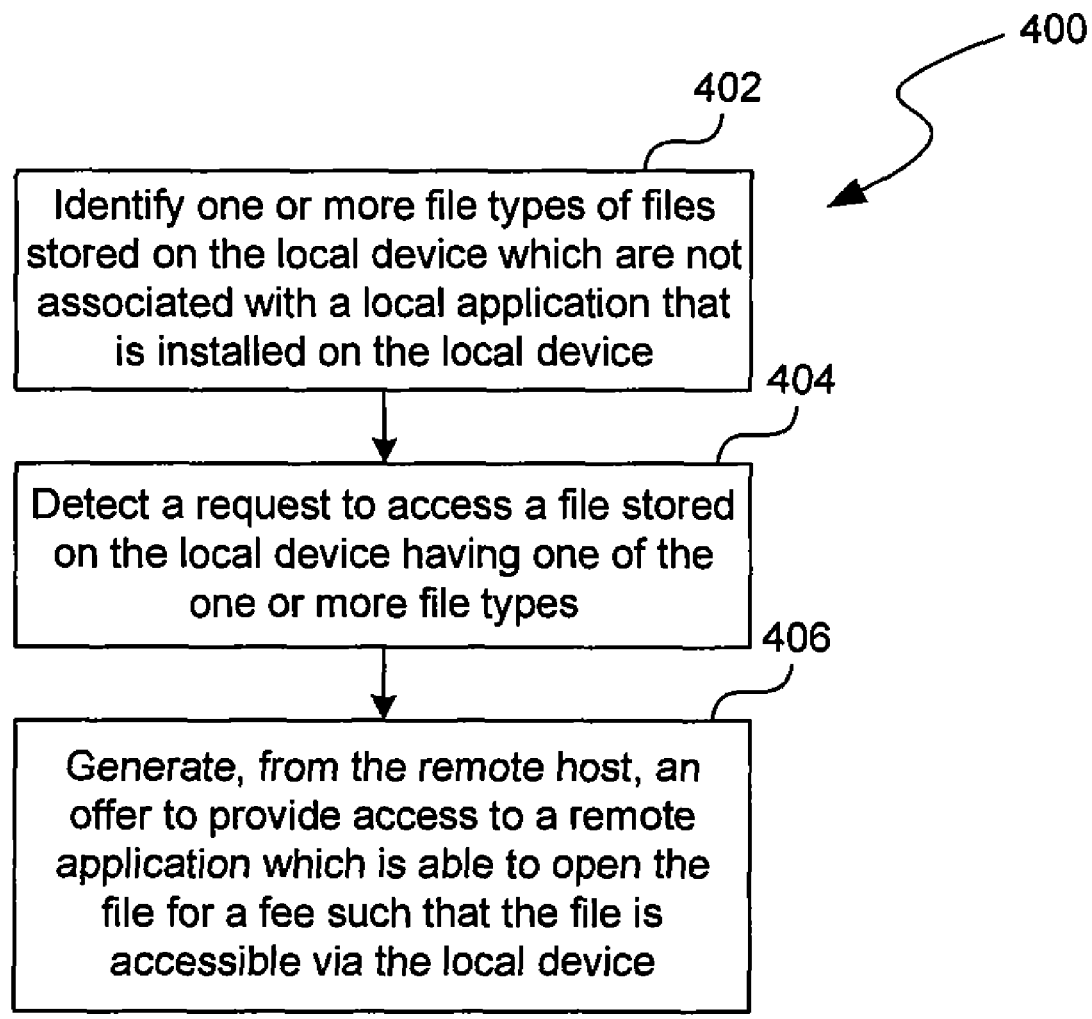
FIG. 4 depicts a flowchart of another example process of a remote host providing a local device with a remote application to access data that is otherwise not accessible by applications installed on the local device.

FIG. 4 depicts a flowchart of another example process of a remote host providing a local device with a remote application to access data that is otherwise not accessible by applications installed on the local device.

The method is organized as a sequence of processes in the flowchart 400. However, it should be understood that these and processes associated with other methods described herein may be reordered for parallel execution or into different sequences of processes.

In process 402, one or more file types of files stored on the local device which are not associated with a local application that is installed on the local device are identified. The one or more file types can be identified by performing file extension mapping or other methods.

In process 404, a request to access a file stored on the local device having one of the one or more file types is detected. In process 406, an offer to provide access to a remote application which is able to open the file for a fee such that the file is accessible via the local device is generated from the remote host. The offer can include multiple services models selectable by a user of the local device. In one embodiment, a selected service model determines the fee and whether the remote application is provided for use by the local device when offline. The fee may determine the amount of time the remote application is available on the local device for offline usage.

In one embodiment, the remote application is transmitted in whole to the local device for execution on the local device when the selected service model provides for offline usage by the local device. In one embodiment, portions of the remote application are streamed to the local device used for execution to open the file when the selected service model does not provide for offline usage by the local device.

Figure 5:
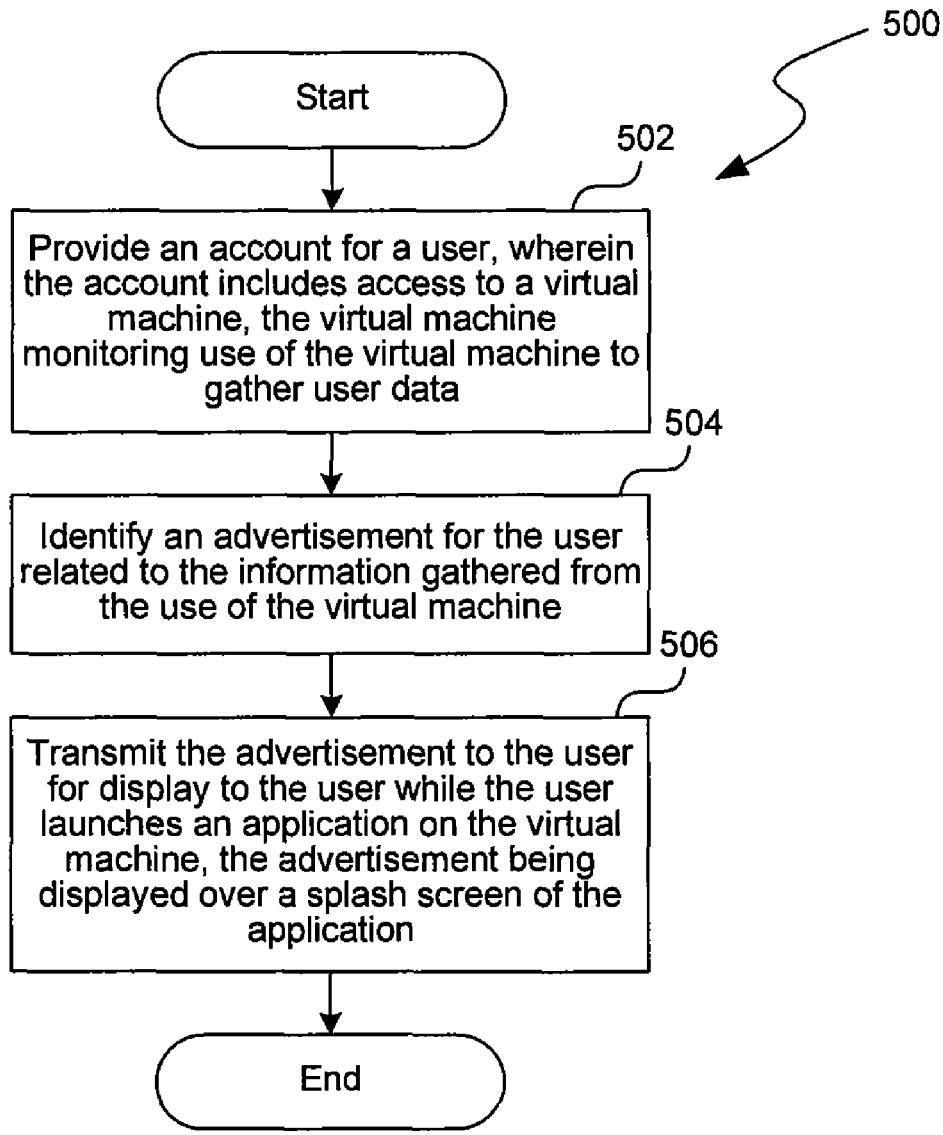
FIG. 5 depicts a flowchart of an example for targeting advertising to a user using a virtual machine hosted by a remote server.

FIG. 5 depicts a flowchart of an example for targeting advertising to a user using a virtual machine hosted by a remote server.

The method is organized as a sequence of processes in the flowchart 500. However, it should be understood that these and processes associated with other methods described herein may be reordered for parallel execution or into different sequences of processes.

The flowchart 500 starts at process 502 with providing an account for a user, wherein the account includes access to a virtual machine, the virtual machine monitoring use of the virtual machine to gather user data. A virtual machine can be created for the account, along with access credentials and storage. For example, a virtual machine can be created on a shared system, an individual computing system, or in another known or convenient manner. The storage may or may not be commonly shared with storage for the virtual machine.

The flowchart 500 continues to process 504 with identifying an advertisement for the user related to the information gathered from the use of the virtual machine. In using a virtual environment, a user can generate useful data that describes the user's habits. For example, time of use, duration, programs used, websites visited, content generated, age, race, products purchased, culture, and other known or convenient data points. These data points can be collected and advertising can be targeted to the user's data points. For example, a teen age user who is using the virtual machine for music related purposes can be offered concert tickets, a graphic designer who regularly uses the machine between 2 and 4 am can be offered coffee, and any other known or convenient offers can be created based on the nature of the user's use.

In the example of FIG. 5, the flowchart 500 continues to process 506 with transmitting the advertisement to the user for display to the user while the user launches an application on the virtual machine, the advertisement being displayed over a splash screen of the application. The advertising is relatively unrestricted because of the control that can be exercised over the virtual machine. For example, as the memory of a virtual machine is directly accessible on the virtual machine host, the advertisement can be added by the virtual machine host at the instruction of an account management engine. Alternatively, a user can receive the advertising as a part of messages received when logging into the virtual machine. Further any known or convenient manner of advertising can be used. Having transmitted advertising, the flowchart terminates.

Figure 6:
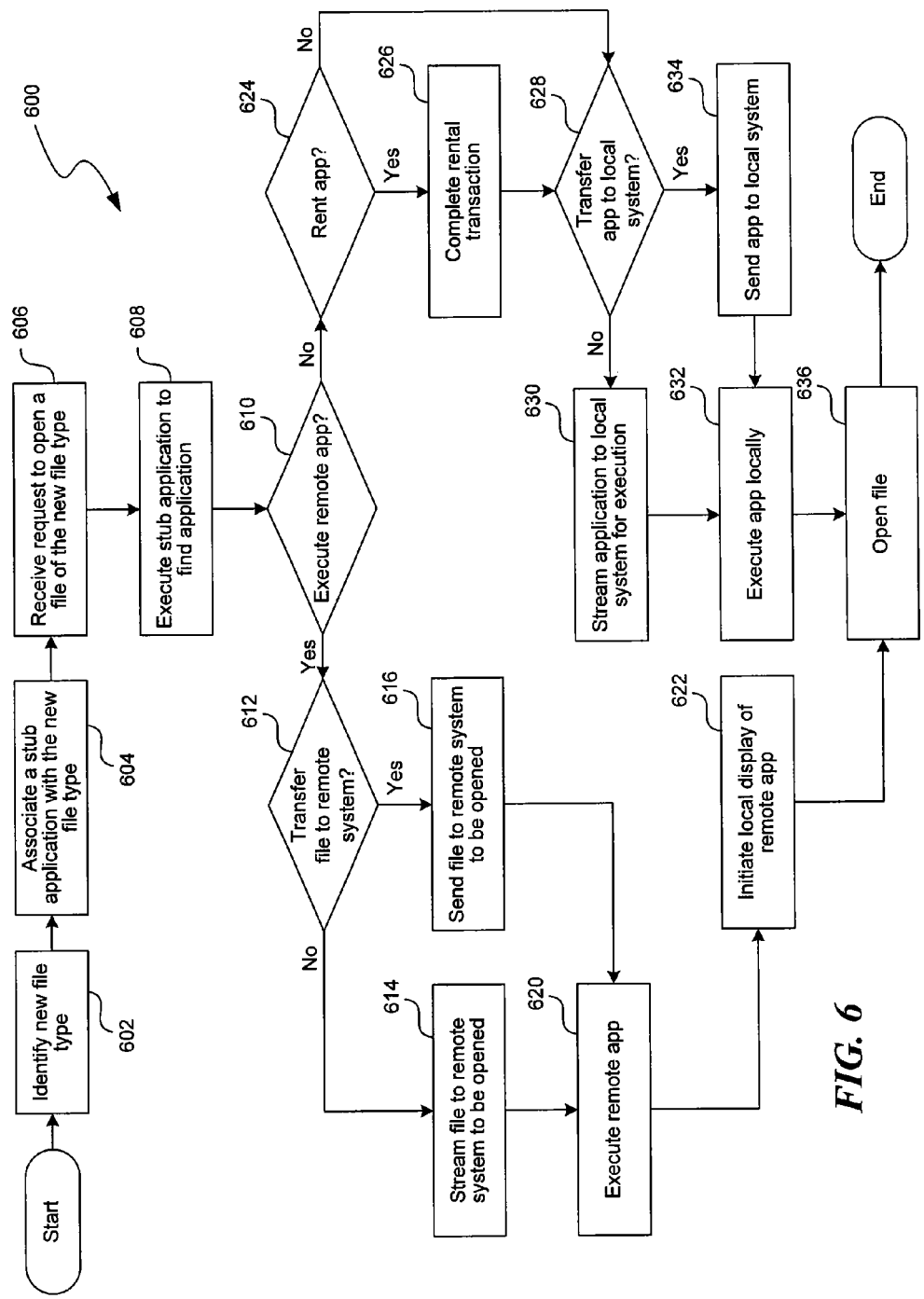
FIG. 6 depicts a flowchart of an example process for opening a file using a remote application/software program provided by a remote host.

FIG. 6 depicts a flowchart of an example process for opening a file using a remote application/software program provided by a remote host.

The method is organized as a sequence of processes in the flowchart 600. However, it should be understood that these and process associated with other methods described herein may be reordered for parallel execution or into different sequences of processes.

In the example of FIG. 6, the flowchart starts at process 602 with identifying a new file type. In a computing system having file types, the file type associates a file of the file type with an application for opening the file. Typically, more than one program can be capable of opening the file, however, one program is chosen as the program to open the file. Where no program is selected as the program for opening files of the file type the computing system may not be able to open the file.

A new file type can be created, entered, or otherwise defined in a computing system. Some systems may recognize a new creator type, application type, file extension, or other file type by the creation or copying of a file to the computing system. For example, a user can register a new file type in a system file types registry. Alternatively, a user could copy a file to the computing system from another computing system. Further, a new file type may be otherwise identified as is known or convenient.

The flowchart continues to process 604 with associating a stub application with the new file type. For example, the stub application can be registered in a file type registry, stored by an operating system, or otherwise associated with the new file type.

As used herein, a "stub application" is an executable application that responds to an operating system command to open a file without actually opening the file. Rather, the stub application can gather and communicates information about the file to a remote system to identify an application that can open the file. For example, the stub application can communicate the file name, extension (if any), file meta-data, and other information to aid the remote system in the selection of an application.

The flowchart continues to process 606 with receiving a request to open a file of the new file type. The request can be user generated or automated. For example, a user could double click an icon of a file to cause an operating system to generate an open file command; a file could be automatically opened by a scheduled action; or the file can be opened in any other known or convenient manner.

The flowchart continues to process 608 with executing the stub application to find the application. The stub application can transmit any information, meta-data, or other information about the file to the remote system to use in identifying an application that can open the file. More than one application can be identified. The information transmitted to the remote system can include the file itself.

The flowchart continues to decision process 610 with deciding whether to execute a remote application. The application in question can be executed to open the file, but the decision can be made whether to execute the application remotely or locally. The remote system can use different hardware than the local system. The decision can be based on user input, decision criteria specified in advance, or any other known or convenient manner of making the decision.

As used herein, "remote" is used to mean executed on a different computing system from a local computing system. A "different computing system" is used to mean a system including at least one processor not used by a "local system." The remote system can be coupled to a local system by a network, and need not be a large geographic distance apart to be considered "remote."

If the decision at process 610 is yes, then the flowchart continues to decision process 612 with deciding whether to transfer an entire file to the remote system. Not all of the file may be needed by the application. If so it may be possible to stream the file by transmitting only the portions of the file that are needed by the application to open the file. This may be helpful when opening a particularly large file. Various criteria can be used to determine whether to send the entire file or to stream the file. For example, the latency of a connection, the size of the file, a user's preference, and any other known or convenient criteria can be used.

If the decision at process 612 is yes, then the flowchart continues to decision process 614 with streaming the file to the remote system to be opened. In streaming the file, portions of the file needed by the application can be sent to the remote system for use by the application. The remote application may also transmit changes, additions, or deletions to the local system to modify the file.

If the decision at process 612 is no, then the flowchart continues to decision process 616 with sending the file to the remote system to be opened. When transmitting the file, the file can be sent by file transfer protocol, a proprietary protocol, or any known or convenient protocol for sending a file between systems.

From process 614 or from process 616, the flowchart proceeds to process 620 with executing a remote application. The remote application can be executed on the remote system. For example, the remote application can be loaded from non-volatile storage into random access memory and executed on a processor of the remote machine. Other methods of executing a remote application can be used.

From process 620, the flowchart proceeds to process 622 with initiating local display of the remote application. The local display of the remote application can be made by locally displaying images of the application on the remote system.

For example, screenshots of the remote application can be displayed. Alternatively, data describing the application on the remote system can be transmitted to the local system and displayed. Further any known or convenient manner of displaying or outputting data can be used.

From process 610, if the decision is no the flowchart proceeds to decision process 624 with deciding whether to rent an application. If the decision is no then a locally executed application can be use to open the file. From decision process 624, if the decision is yes, the flowchart proceeds to process 626 with completing a rental transaction. Software can be rented to a local system. The rental can be on any term, for example, an hour, a day, or a month.

From decision process 624, if the decision is no, or from process 626, the flowchart proceeds to process 628 with transferring an application to the local system. No locally installed application exists on the computing system; therefore, an application can be transmitted to the local system. "Yes" means that the application is transferred to the local system in whole for execution on the local system. "No" means the application can be executed as a streamed application on the local system.

From decision process 628, if the decision is yes the flowchart proceeds to process 634 with sending the application to the local system. The application can be transmitted by any application transmission protocol. For example, FTP, RTSP, HTTP, or another known or convenient protocol.

From decision process 628, if the decision is no the flowchart proceeds to process 630 with streaming the application to the local system for execution. The application can be streamed by transmitting portions of the application needed for execution. More than one transmission can be made, and the streamed application can be saved in part on the local system. It is possible for all of the streamed application to be transmitted to the local system.

From process 630 or from process 634, the flowchart proceeds to process 632 with executing the application locally. Execution of the application can be as discussed above in regard to either the streamed application or the application sent to the local system. As used herein "executed locally" is used to mean the application can use a processor and memory of the local system for execution.

From process 622, or from process 632, the flowchart proceeds to process 636 with opening the file. Using one or more of the methods discussed above, the application is executed. Once executed, the application can transfer portions of the file to memory and execute routines to view, modify or otherwise use the file. Having opened the file, the flowchart terminates.

Figure 7:
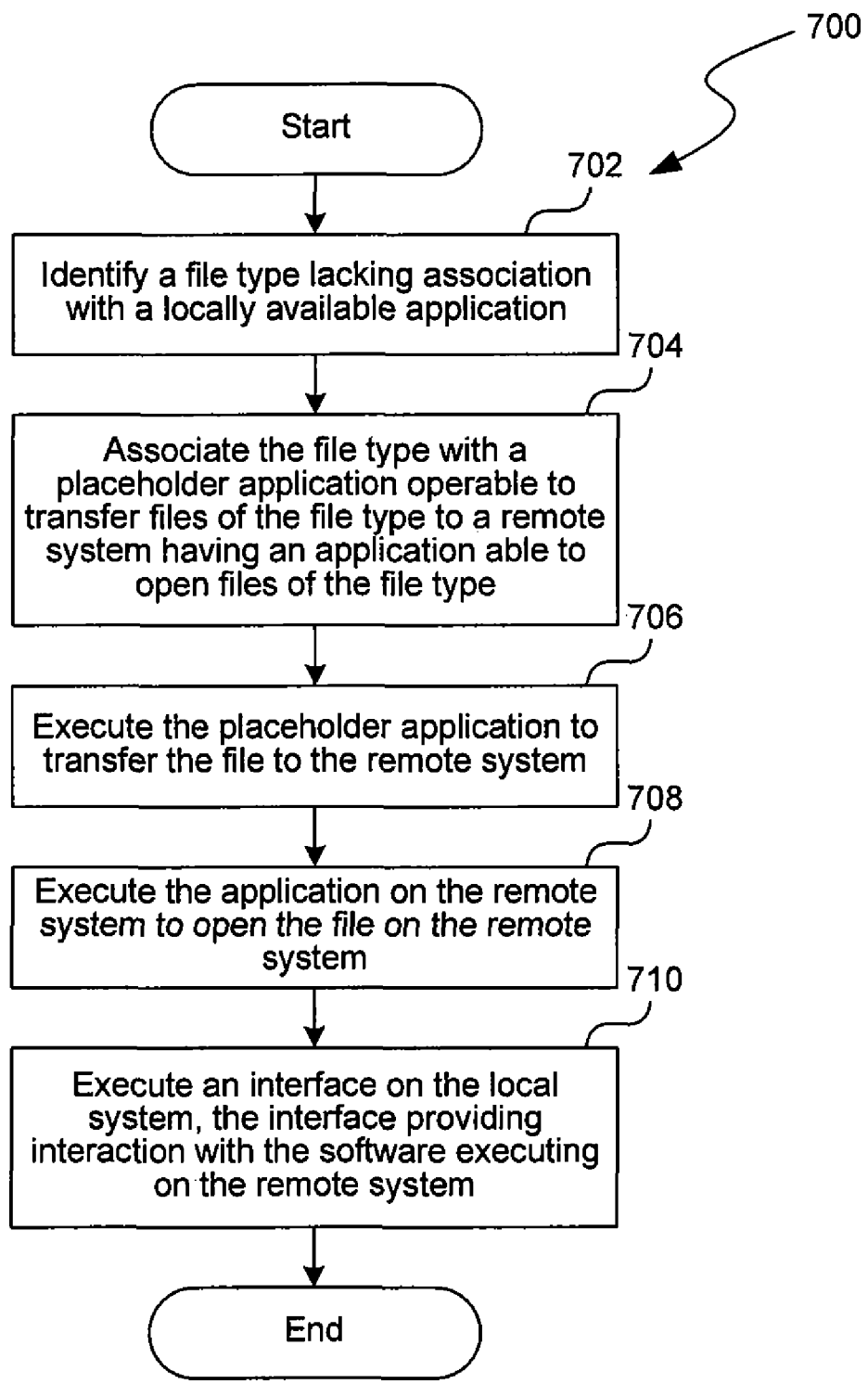
FIG. 7 depicts a flowchart of an example process for using a placeholder application to facilitate the opening of a file through a remote system which can be streamed and cached.

FIG. 7 depicts a flowchart of an example process for using a placeholder application to facilitate the opening of a file through a remote system.

The method is organized as a sequence of modules in the flowchart 700. However, it should be understood that these and modules associated with other methods described herein may be reordered for parallel execution or into different sequences of modules.

The flowchart starts at module 702 with identifying a file type lacking association with a locally available application. A method for identifying a file type lacking association is discussed above in regard to FIG. 6.

The flowchart continues to module 704 with associating the file type with a placeholder application operable to transfer files of the file type to a remote system having an application able to open files of the file type. The placeholder application can associate the file type using any known or convenient method. For example, a process for identifying a file type lacking association is discussed above in regard to FIG. 6.

As used herein, a "placeholder application" is an application that can collect information about a file on behalf of a remote system. The placeholder can be executed by an operating system to identify an application for the file. For example, the placeholder application can execute in response to receiving a system file open command.

The flowchart continues to module 706 with executing the placeholder application to transfer the file to the remote system. The operating system can receive a user command or other command to open a file and can automatically execute the placeholder application with instructions for the placeholder application to open the file. However, the placeholder application can ignore the open file request, and instead can transmit the file to a remote system for another application to open.

The flowchart continues to module 708 with executing the application on the remote system to open the file on the remote system. The execution can be initiated by an application on the remote system that is responsive to a command from the placeholder application. Once open, the application can open the file transferred by the placeholder application.

The flowchart continues to module 710 with executing an interface on the local system, the interface providing interaction with the software executing on the remote system. The interface can transmit and receive information with the local system. The information can describe or depict the actions of the application in opening the file. For example, images of the application and file can be displayed. Alternatively, data can be displayed. Further any known or convenient manner of displaying the actions of the application can be displayed. Having executed an interface on the local system, the flowchart terminates.

Figure 8:
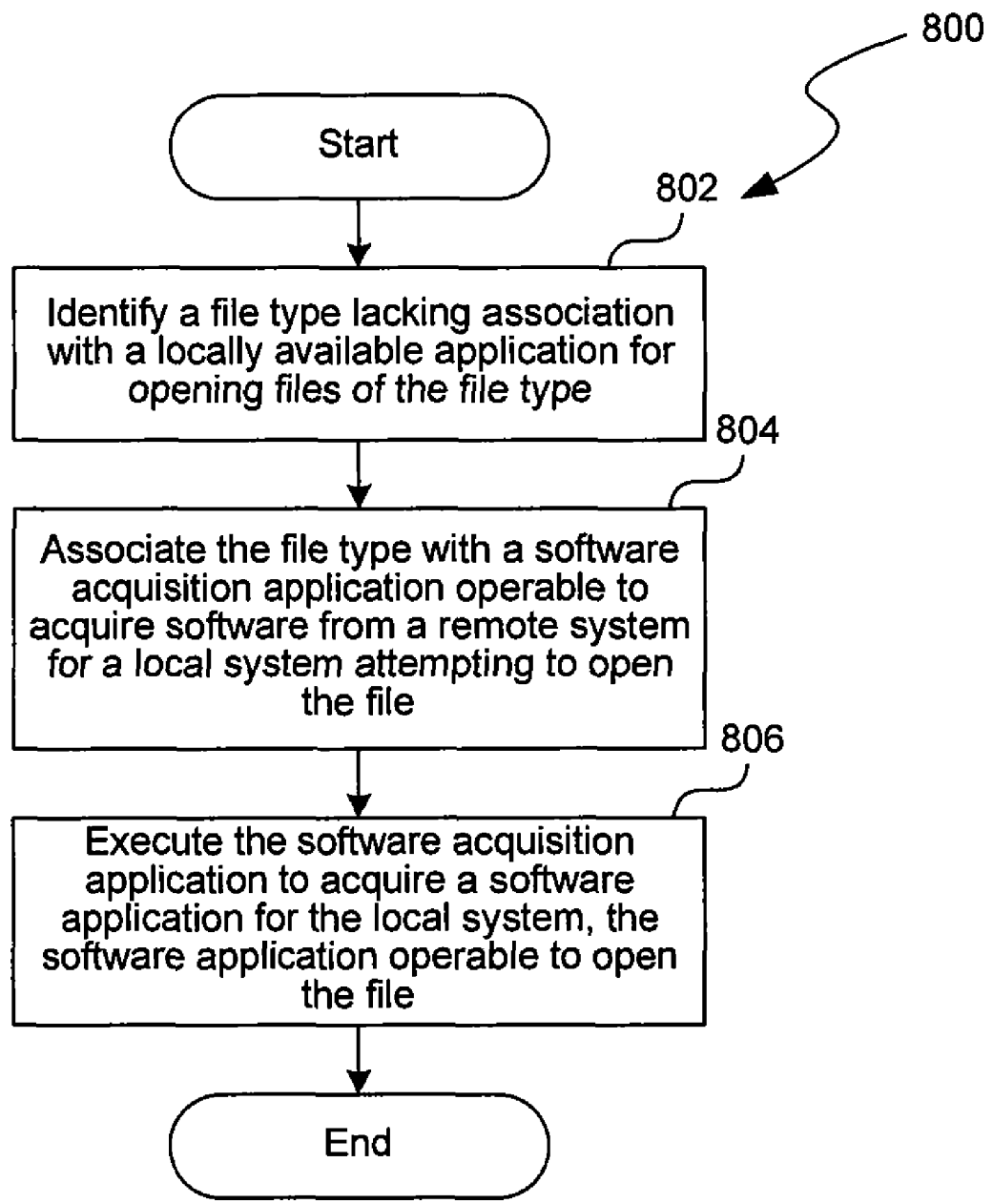
FIG. 8 depicts a flowchart of an example process for using a software acquisition application to acquire software/application for locally opening a file via file mapping.

FIG. 8 depicts a flowchart of an example process for using a software acquisition application to acquire software/application for locally opening a file.

The method is organized as a sequence of modules in the flowchart 800. However, it should be understood that these and modules associated with other methods described herein may be reordered for parallel execution or into different sequences of modules.

The flowchart starts at module 802 with identifying a file type lacking association with a locally available application for opening files of the file type. A method for identifying a file type lacking association is discussed above in regard to FIG. 7.

The flowchart continues to module 804 with associating the file type with a software acquisition application operable to acquire software from a remote system for a local system attempting to open the file. As used herein, a "software acquisition" application is any application operable to download an application for execution on a local system in response to an open file command. The software acquisition application can be associated with the file type using one of the methods for identifying a file type discussed above in regard to FIG. 6.

The flowchart continues to module 806 with executing the software acquisition application to acquire a software application for the local system, the software application operable to open the file. The software acquisition application can download the software application necessary to open the file. This action can include one or more of establishing an account, renting the application, downloading the application, and any other known or convenient application management action. Having executed an interface on the local system, the flowchart terminates.

FIG. 9 shows a diagrammatic representation of a machine in the example form of a computer system within which a set of instructions, for causing the machine to perform any one or more of the methodologies discussed herein, may be executed.

In the example of FIG. 9, the computer system 900 includes a processor, memory, non-volatile memory, and an interface device. Various common components (e.g., cache memory) are omitted for illustrative simplicity. The computer system 900 is intended to illustrate a hardware device on which any of the components depicted in the example of FIG. 1 (and any other components described in this specification) can be implemented. The computer system 900 can be of any applicable known or convenient type. The components of the computer system 900 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1100. The interface can include an analog modem, isdn modem, cable modem, token ring interface, satellite transmission interface (e.g. "direct PC"), or other interfaces for coupling a computer system to other computer systems. The interface 208 can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the interface.

In operation, the computer system 900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Figure 10:
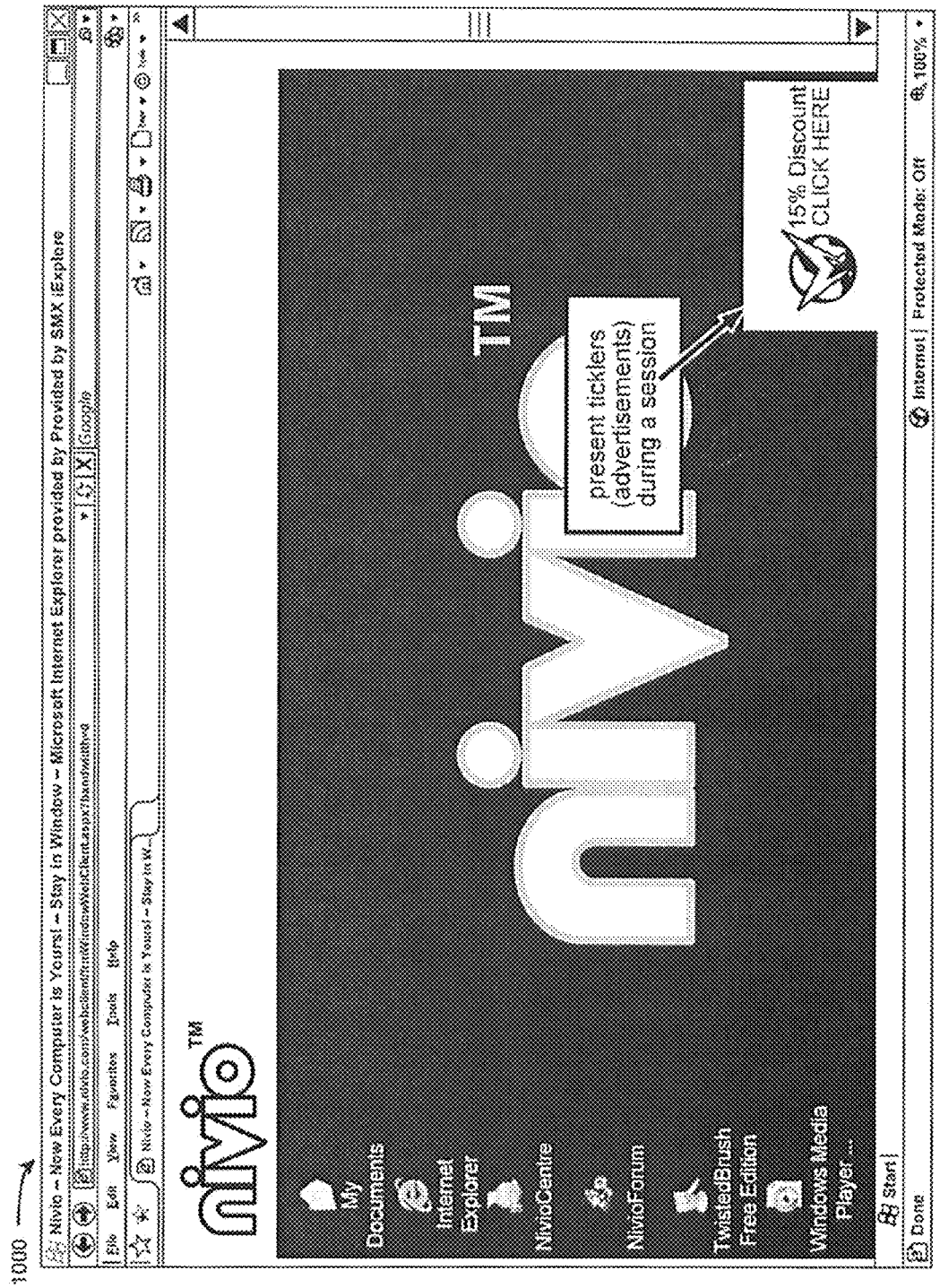
FIG. 10 depicts a screenshot of an example of a tickler ad displayed during use of a virtual machine.

FIG. 10 depicts a screenshot of an example of a tickler ad displayed during use of a virtual machine.

As used herein, a "tickler" is an attention seeking advertisement temporarily displayed to a user. In use, a tickler can be made clickable, linking to a page displaying more details about the advertised product or service. A tickler is a great way to push out real time advertising and can be timed to attract attention at particular times. Where a user is logged out at a time to display advertising, the tickler can be delayed until the user logs in.

Figure 11:
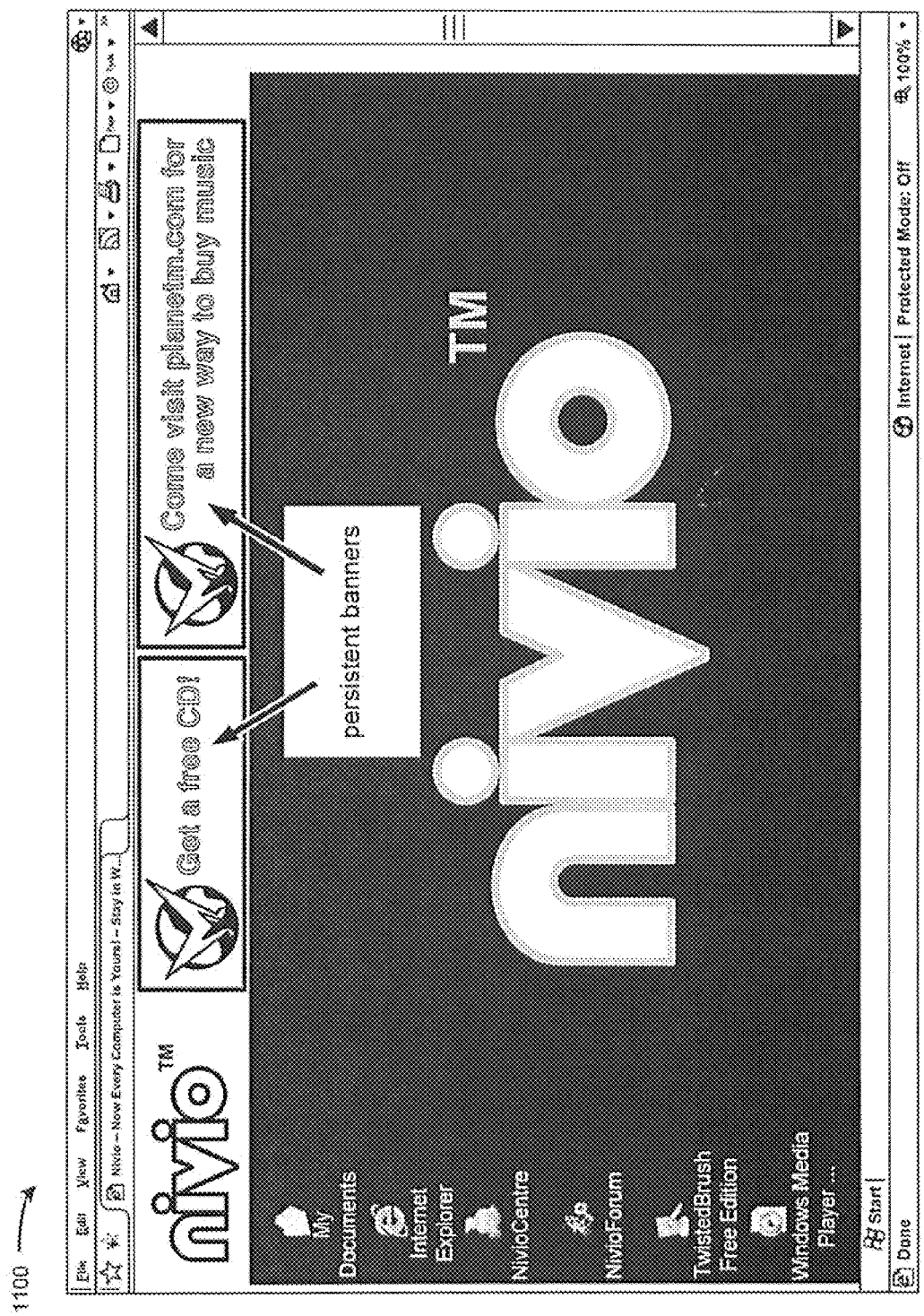
FIG. 11 depicts a screenshot of an example of a banner ad displayed during use of a virtual machine.

FIG. 11 depicts a screenshot of an example of a banner ad displayed during use of a virtual machine. Banner ads can be displayed in various locations on a screen during the use of a virtual machine. For example, a banner can be displayed at a login window, above a screen during use of a virtual machine, or in another known or convenient location.

Figure 12:
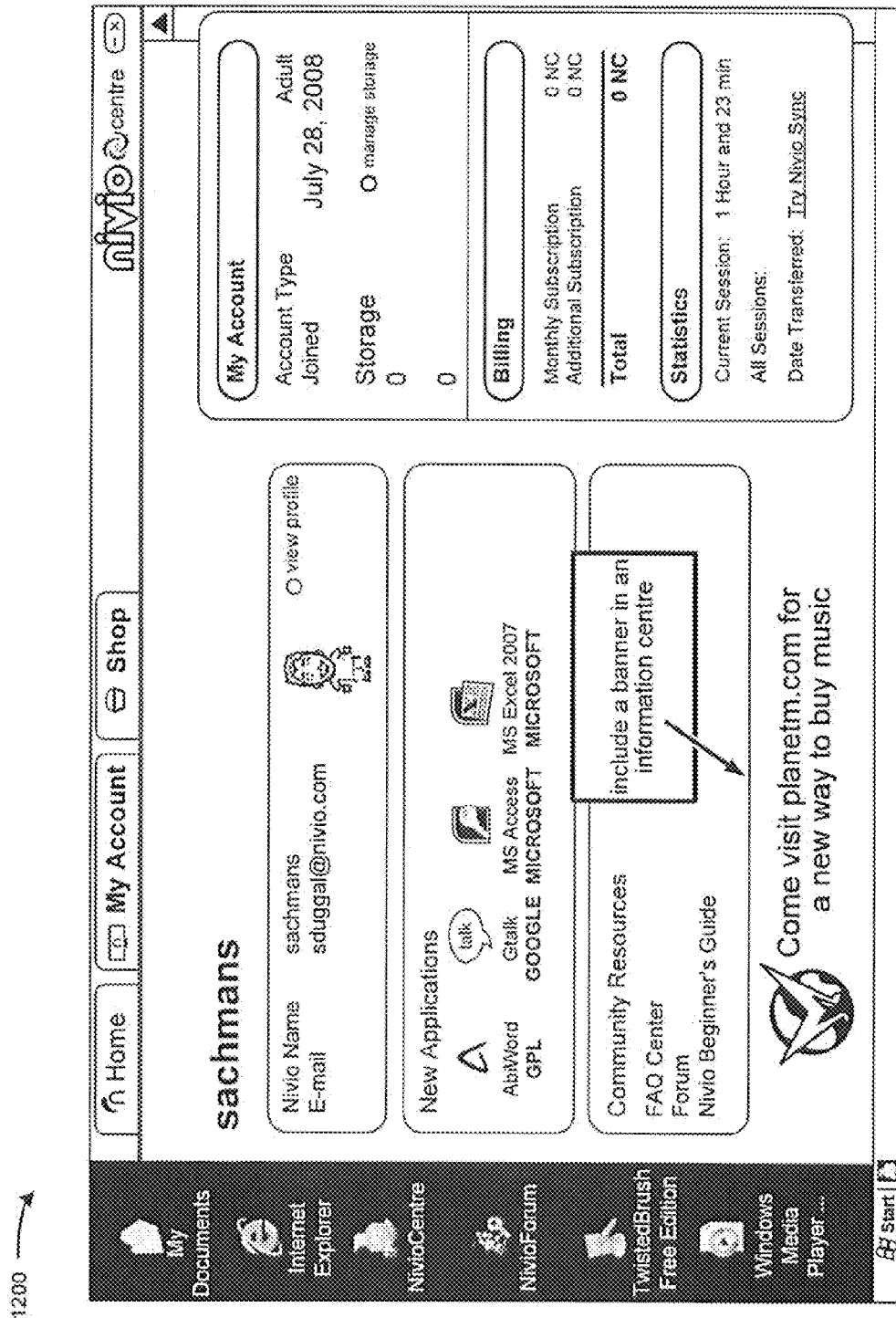
FIG. 12 depicts a screenshot of an example of a banner ad displayed in an information center.

FIG. 12 depicts a screenshot of an example of a banner ad displayed in an information center. Banner ads can be placed in convenient locations in one or more locations in the information centre.

Figure 13:
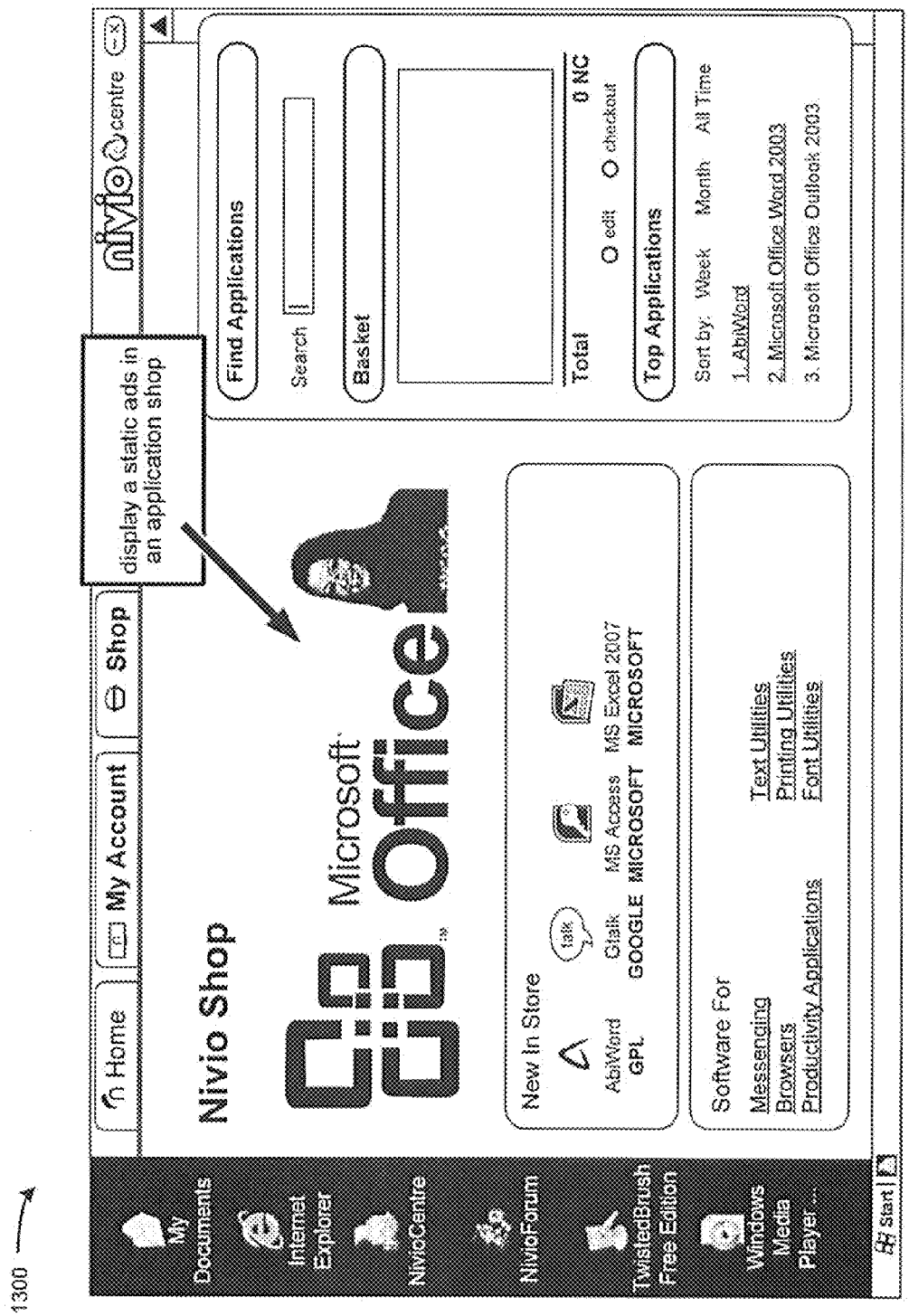
FIG. 13 depicts a screenshot of an example of an ad displayed in an application shop.
Figure 14:
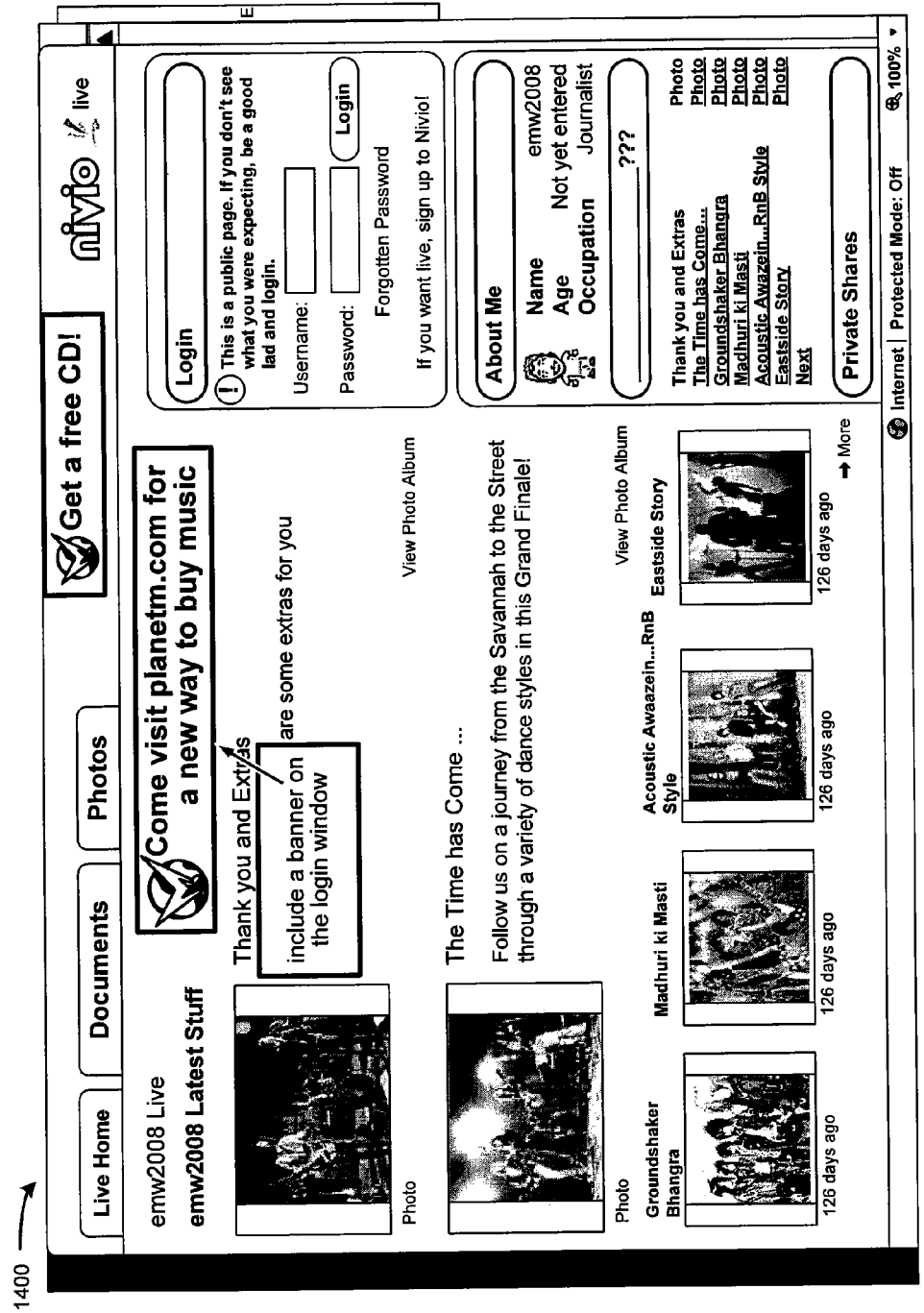
FIG. 14 depicts a screenshot of an example of an ad displayed in a window for an online sharing network.

FIG. 13 depicts a screenshot of an example of an ad displayed in an application shop. The ad can but need not be associated with software for rent or sale in the application shop FIG. 14 depicts a screenshot of an example of an ad displayed in a window for an online sharing network. One or more ads can be placed in an attention attracting location in the window.

Figure 15:
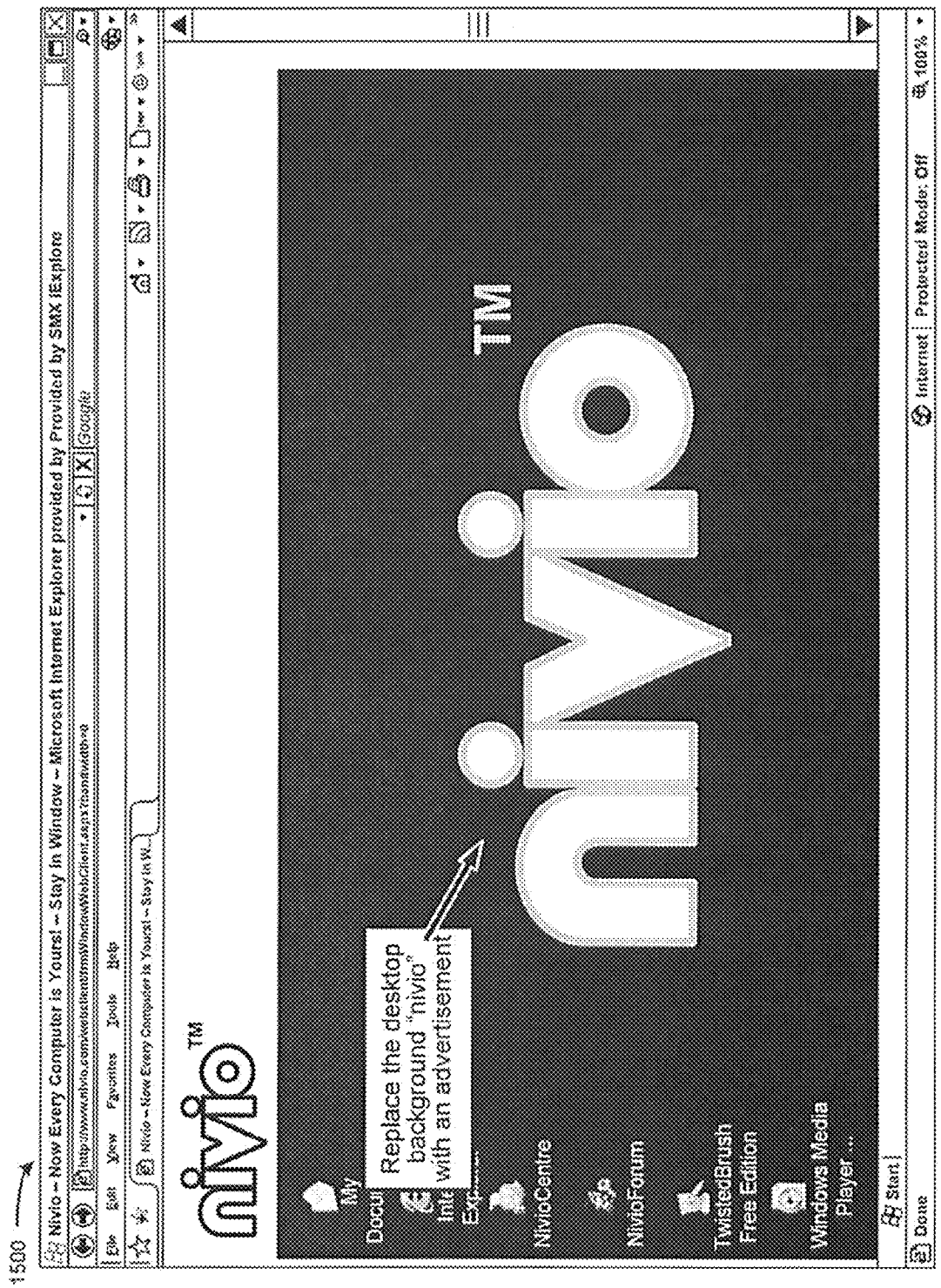
FIG. 15 depicts a screenshot of an example of advertising on the desktop of a virtual machine.

FIG. 15 depicts a screenshot of an example of advertising on the desktop of a virtual machine. In advertising on a virtual machine, it is possible to retain significant control over the user's experience. One aspect of the experience is the desktop; it is possible to replace the background of the desktop with advertising and rent this advertising space to advertisers.

Figure 16:
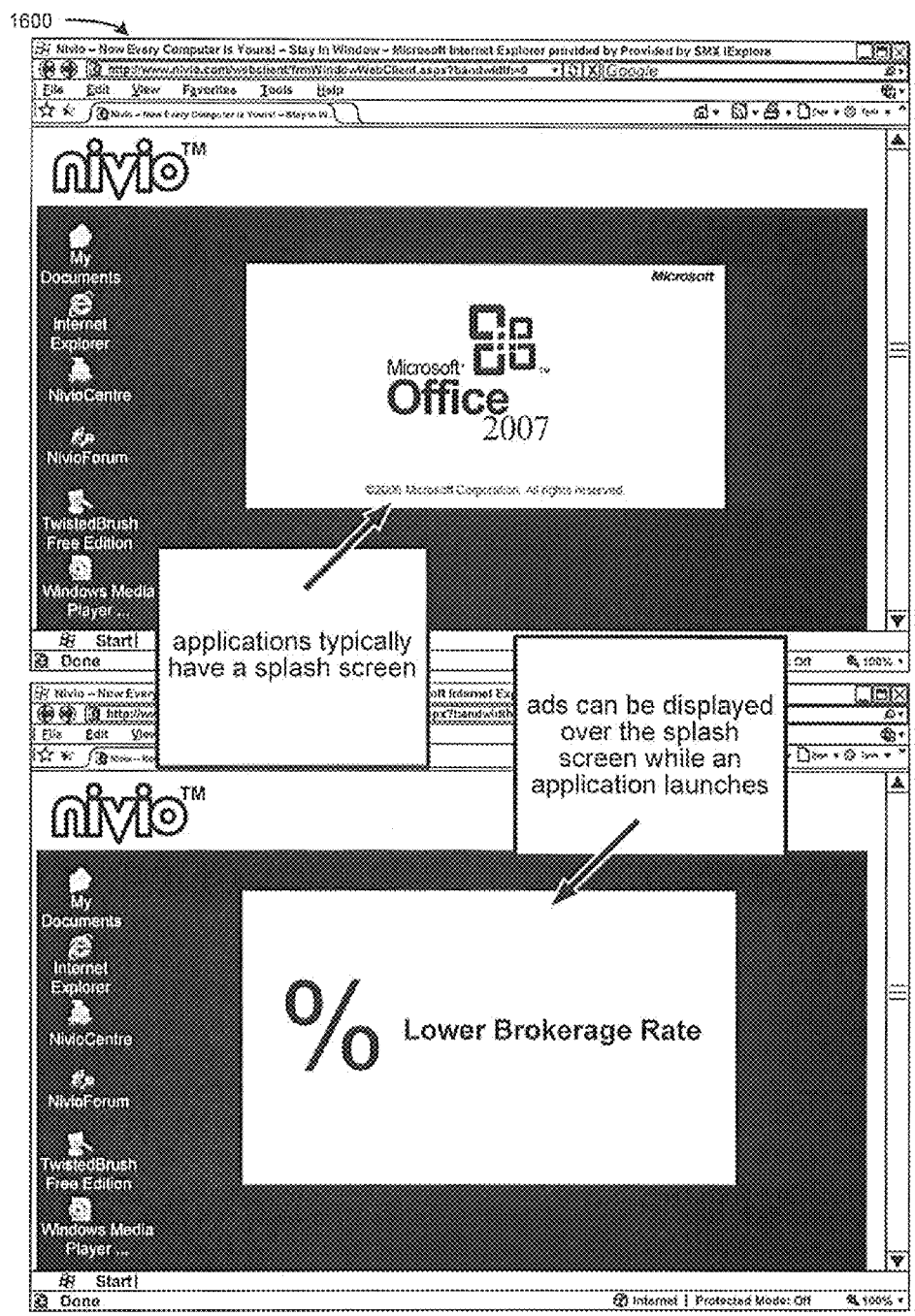
FIG. 16 depicts a screenshot of an example of an advertisement displayed over an application splash screen.

FIG. 16 depicts a screenshot of an example of an advertisement displayed over an application splash screen. When starting a program the program usually displays a splash screen, or image relating to the program being executed. This splash screen is displayed for a brief, but memorable period of time. Advertising can cover this splash screen. Therefore, this space can be considered advertising space, and rented or sold.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶13, other aspects may likewise be embodied as a means-plus-function claim, or in other forms, such as being embodied in a computer-readable medium. (Any claims intended to be treated under 35 U.S.C. §112, ¶13 will begin with the words "means for".) Accordingly, the applicant reserves the right to add additional claims after filing the application to pursue such additional claim forms for other aspects of the disclosure.

What is claimed is:

1. A method of providing a local device with computing services from a remote host, the method, comprising:
   detecting a request generated from a local device to access data;
   in response to determining that the data is not accessible by applications installed on the local device;
   providing, from the remote host, a remote application which is able to access the data for a fee to enable the data to be accessed from the local device;
   wherein, a selected service model determines the fee and whether to provide the remote application for use by the local device when offline; and
   streaming portions of the remote application to the local device used for execution to open the file when the selected service model does not provide for offline usage by the local device.

2. The method of claim 1, further comprising:
   determining that a predetermined number of advertisements displayed on the local device has been accessed;
   waiving the fee for access of the remote application.

3. The method of claim 1, wherein, the fee enables access to the remote application for a predetermined amount of time.

4. The method of claim 1, further comprising,
   streaming at least a portion of the remote application to the local device to for execution on the local device to access the data stored on the local device.

5. The method of claim 1, wherein, the remote application is downloaded by the local device in whole for offline usage and stored in cache on the local device.

6. The method of claim 1, wherein, the remote application is executed on the remote host to access the data.

7. The method of claim 6, wherein, the data is stored on remote storage of the remote host.

8. The method of claim 6, further comprising,
   transmitting the data from the local device to the remote host for access using the remote application executable on the remote host;
   transmitting images of the remote application to the local device for display on the local device depicting results of accessing the data.

9. The method of claim 8, further comprising, identifying a portion of the data to be transmitted to the remote host needed by the remote application for access.

10. The method of claim 8, further comprising, transmitting data modified by the remote application on the remote host to the local device.

11. The method of claim 1, further comprising,
    storing data generated at the local device in the remote storage on the remote host;
    wherein, the remote storage is accessible using a vanity URL that is unique to the user.

12. The method of claim 1, wherein, the data generated at the local device includes changes to content or files stored at the local device.

13. The method of claim 1, further comprising, performing file extension mapping to determine whether the data is accessible by the applications that are installed on the local device.

14. The method of claim 1, further comprising,
    synchronizing content stored on local device on remote storage of the remote device;
    wherein, the content is associated with a user.

15. The method of claim 14,
    wherein, the content is associated with a local directory and the content is synchronized in a remote directory on the remote storage;
    wherein, the content stored in the remote directory has associated privacy settings;
    wherein, the remote directory is accessible using uniform resource locator (URL) that is associated with the user.

16. The method of claim 14, further comprising:
    synchronizing additional content stored on additional local devices associated with the user with the remote directory.

17. The method of claim 15,
    wherein, the content is synchronized between the local and remote directories in response to a drag and drop action;
    wherein, the content is converted to HTML upon transmission from the local device to the remote storage associated with the remote host.

18. The method of claim 17, wherein the drag and drop action is performed from a local file to a virtual drive representing the remote storage associated with the remote host.

19. The method of claim 17, wherein the drag and drop action is performed from a virtual folder representing the remote storage associated with the remote host.

20. A method of providing a local device with computing services from a remote host, the method, comprising:

identifying one or more file types of files stored on the local device which is not associated with a local application that is installed on the local device;

detecting a request to access a file stored on the local device having one of the one or more file types;

generating, from the remote host, an offer to provide access to a remote application, the remote application configured to open the file for a fee such that the file is accessible via the local device;

wherein, a selected service model determines the fee and whether to provide the remote application for use by the local device when offline; and streaming portions of the remote application to the local device used for execution to open the file when the selected service model does not provide for offline usage by the local device.

21. The method of claim 20, further comprising, transmitting the remote application in whole to the local device for execution on the local device when the selected service model provides for offline usage by the local device.

22. The method of claim 20, wherein, the fee determines the amount of time the remote application is available on the local device for offline usage.

23. The method of claim 20, wherein, the one or more file types are identified by performing file extension mapping.

24. The method of claim 20, wherein, the offer includes multiple services models selectable by a user of the local device.

25. A system for providing a user device with computing services from a remote host, comprising:

a file type identifier agent that identifies one or more files stored on the user device, the files having one or more file types, the files not accessible by a local application installed on the user device;

a file manager that detects a request to access a file stored on the user device;

an application management engine that generates an offer to provide access to a remote application stored on the remote host, the remote application configured to open the file such that the file is accessible via the user device;

wherein, the remote application is provided for accessing the file via a fee-based arrangement or an advertisement-based arrangement;

wherein, a selected service model determines the fee and whether to provide the remote application for use by the user device when offline; and streaming portions of the remote application to the user device used for execution to open the file when the selected service model does not provide for offline usage by the user device.

26. The system of claim 25, wherein, in the fee-based arrangement, the remote application is available for purchase or rental over a period of time.

27. The system of claim 25, wherein, in the advertisement-based arrangement, the remote application is available when a predetermined number of advertisements displayed on the user device has been accessed.

28. The system of claim 25, wherein the remote host includes:

one or more virtual machine host(s), comprising individualized hardware units to execute instructions for supporting one or more virtual machine(s);

a user identification engine, configured for the user device to access one virtual machine of the remote host;

an authentication/VM data repository, configured to store data including user data from the user device, the one or more virtual machine(s), the virtual machine(s)'s data, data files, and/or data/system files for instantiating virtual machine(s);

a load balancing engine, configured to balance the resources demands among virtual machine(s) of the remote host;

an account management engineer, configured to manage billing, transactions, and advertisements;

a file synchronization engine, configured to synchronize content stored on the user device and a remote storage of the remote host;

a storage management engine, configured to perform read and/or write operations on behalf of the one or more virtual machine host(s) and/or the file synchronization engine;

an advertisement repository, configured to store one or more advertisement(s), advertisement account information, and/or information related to the one or more advertisement(s); and an application repository, configured to store application executable files, libraries, supporting documentation, and/or application data.

* * * * *